US008396769B1

(12) United States Patent
Selig et al.

(10) Patent No.: US 8,396,769 B1
(45) Date of Patent: Mar. 12, 2013

(54) APPARATUSES, METHODS AND SYSTEMS FOR A FUND ENGINE

(75) Inventors: Stacy Danielle Selig, Summit, NJ (US); Gregory Bernard Kuppenheimer, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 700 days.

(21) Appl. No.: 12/410,293

(22) Filed: Mar. 24, 2009

Related U.S. Application Data

(60) Provisional application No. 61/038,838, filed on Mar. 24, 2008.

(51) Int. Cl.
*G06Q 40/00* (2012.01)
(52) U.S. Cl. .......................................... 705/35
(58) Field of Classification Search .................. None
See application file for complete search history.

(56) References Cited

U.S. PATENT DOCUMENTS

| | | | | |
|---|---|---|---|---|
| 7,685,056 | B2 * | 3/2010 | Menon | 705/37 |
| 7,689,492 | B2 * | 3/2010 | Coates | 705/36 R |
| 2007/0219894 | A1 * | 9/2007 | Guichard | 705/36 R |

\* cited by examiner

*Primary Examiner* — Olabode Akintola
(74) *Attorney, Agent, or Firm* — Perkins Coie LLP

(57) ABSTRACT

The disclosure details the implementation of apparatuses, methods and systems for a Fund Engine which, in various embodiments, may provide dynamic management, analysis and/or control of investments utilizing multiple asset classes and strategies. In particular, this disclosure discusses the application of the Fund Engine to investments including structured notes utilizing constant proportion portfolio protection. In one embodiment, the Fund Engine may construct, facilitate, assist and/or manage one or more multi-strategy master funds by investing assets of the funds in principal protected notes, the value of which may be determined by reference to the performance of a multi-strategy reference portfolio fund. In one implementation, Notes may include senior unsecured debt obligations. In one implementation, the Fund Engine may achieve the reference portfolio fund's objectives by employing a constant proportion portfolio protection tool that allocates the reference portfolio fund's assets, net of any fees and expenses, between investments that are actively managed and exposed to market risks and fixed income investments.

28 Claims, 8 Drawing Sheets

US 8,396,769 B1

APPARATUSES, METHODS AND SYSTEMS FOR A FUND ENGINE

RELATED APPLICATIONS

Applicants hereby claim priority under 35 USC §119 for U.S. provisional patent application Ser. No. 61/038,838 filed Mar. 24, 2008, entitled "APPARATUSES, METHODS AND SYSTEMS FOR A FUND ENGINE".

The entire contents of the aforementioned application is herein expressly incorporated by reference.

FIELD

The present invention is directed generally to apparatuses, methods, and systems for finance, and more particularly, to apparatuses, methods and systems for a Fund Engine.

BACKGROUND

Funds allow multiple entities to collectively invest in assets or investments that may otherwise be unavailable to individual entities. The value of a fund is generally the assets of the fund less the value of the liabilities of the fund. A master fund is an investment vehicle that enables individual investors to invest money into one or more underlying investments that are generally operated by professional managers. Master funds can generally be categorized by type, for example, discretionary funds, fund of funds, feeder funds, etc. A portfolio is a grouping of financial assets including, for example, stocks, bonds and cash equivalents, as well as their mutual, exchange-traded and closed-fund counterparts. Portfolios may be held directly by investors or managed by professionals.

SUMMARY

This disclosure details apparatuses, methods and systems for a Fund Engine that delivers dynamic management, analysis and/or control of investments utilizing multiple asset classes and strategies. In particular, this disclosure discusses the application of the Fund Engine to administering primary investments including structured notes backed by secondary investments utilizing constant proportion portfolio protection rebalancing strategies. In one embodiment, the Fund Engine may construct, facilitate, assist and/or manage one or more multi-strategy primary and/or master funds by investing assets of the funds in principal protected notes, the value of which may be determined by reference to the performance of a secondary and/or multi-strategy reference portfolio fund. In one implementation, notes may include senior unsecured debt obligations. In one implementation, the Fund Engine may achieve the reference portfolio fund's objectives by employing a constant proportion portfolio protection tool that allocates and/or rebalances the reference portfolio fund's assets, net of any fees and expenses, between investments that are actively managed and exposed to market risks and fixed income investments.

BRIEF DESCRIPTION OF THE DRAWINGS

The accompanying drawings illustrate various non-limiting, example, inventive aspects in accordance with the present disclosure.

Figure 1:
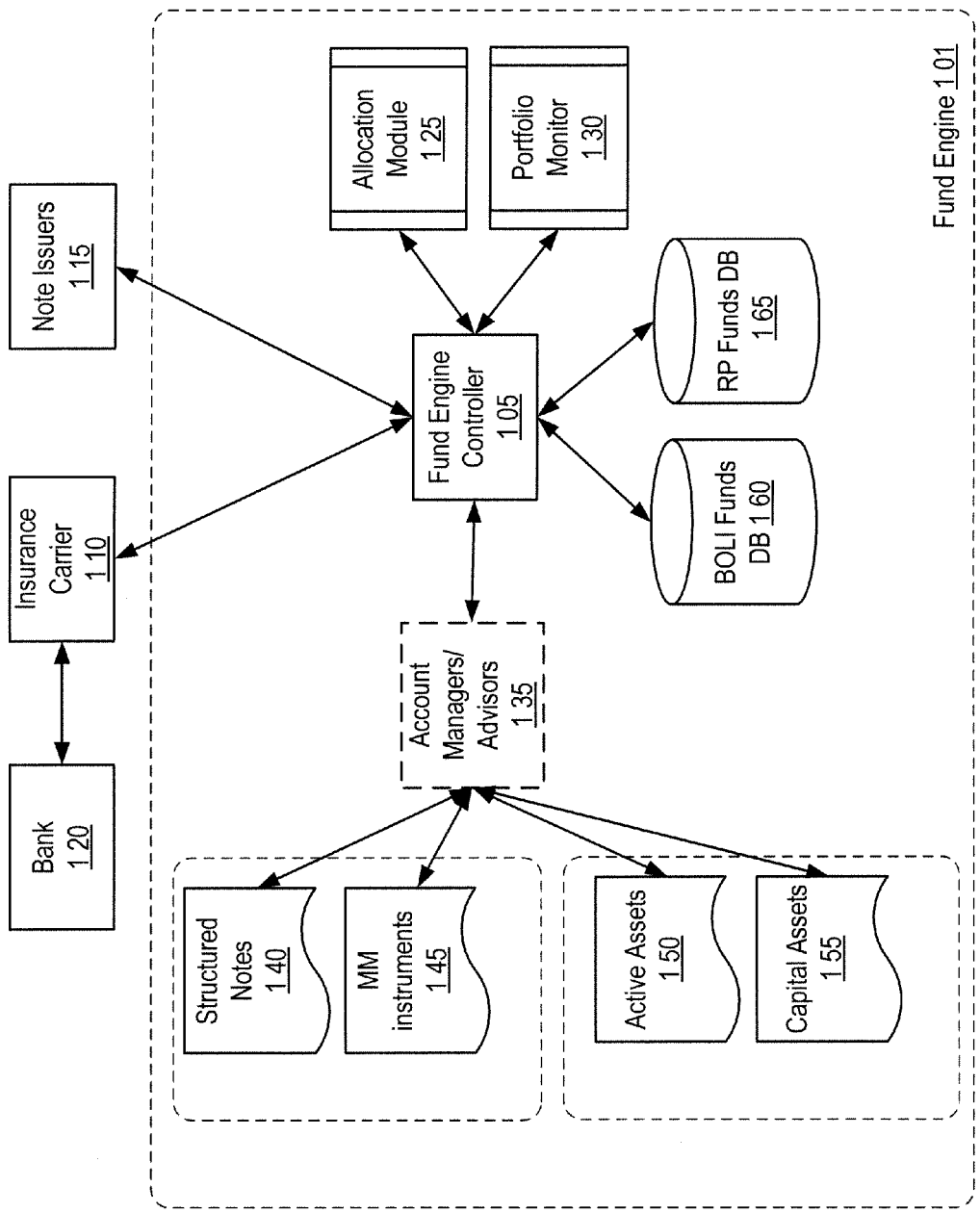
FIG. 1 shows an implementation of data flow in one embodiment of Fund Engine operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Fund Engine

This disclosure details apparatuses, methods and systems for a Fund Engine (hereinafter, "Fund Engine") that delivers dynamic management, analysis and/or control of investments utilizing multiple asset classes and strategies. In particular, this disclosure discusses the application of the Fund Engine to investment funds comprising and/or supporting structured notes, and wherein one or more of said funds may employ a constant proportion portfolio protection tool for periodic rebalancing. It is to be understood that the Fund Engine may be readily configured/customized for a wide range of other applications or implementations. For example, aspects of the Fund Engine may be adapted to additional or alternative investment opportunities, instruments, strategies, and/or the like. For example, in one embodiment, top-level and/or other investments associated with the Fund Engine may comprise pools of assets rather than and/or in addition to funds. It is to be understood that the Fund Engine may be further adapted for various other implementations or applications.

In one embodiment, the Fund Engine may construct, facilitate, assist and/or manage a multi-strategy master fund (hereinafter, "Fund") by investing assets of the Fund in structured and/or principal protected notes (hereinafter, each a "note" and collectively, the "notes"), the value of which will be determined by reference to the performance of a multi-strategy Reference Portfolio Fund (hereinafter, "RP Fund"). In some embodiments, the Fund may comprise a bank-owned life insurance ("BOLI") fund. In one implementation, notes may include senior unsecured debt obligations. In one implementation, the Fund Engine may specify a threshold rating restriction for each note at the time of purchase (e.g., each note rated at least Aa3 by Moody's Investors Service, Inc. or AA- by Standard & Poor's Rating Services, a credit equivalent thereof, and/or the like) and/or specify a maturity date or dates, for example, specifying a note will mature on the last business day of the month (the "note maturity date"), unless delayed due to a market disruption event with respect to the notes. In some implementations, the Fund may receive, with respect to each note, monthly interest payments and, on the note maturity date, a minimum amount equal to at least the par value of the note. In some implementations, the Fund Engine may vary the composition of the Fund such that, from time to time, the Fund may not be substantially invested in notes, and may invest Fund assets in other eligible investments. The Fund Engine may, for example, allocate a particular percent (e.g., 5%) of the Fund's net asset value ("NAV") to cash, cash equivalents, money market instruments, short-term investments, and/or the like pending allocation of such capital to purchase notes, in order to meet operational needs, to maintain liquidity, to fund anticipated redemptions or expenses of the Fund, and/or the like. In some embodiments, either or both of the Fund and RP Fund may be specified corporate structures, for example, a Delaware limited liability company. In alternative embodiments, Fund Engine managed investments may comprise a collection of assets without an associated fund structure and/or legal entity. For example, instead of a Master Fund, the Fund Engine may administer a top-level collection of assets to support the payout obligations of one or more BOLI policies. In another example, instead of an RP Fund, the Fund Engine may administer a reference asset pool to back obligations associated with one or more structured notes. In some embodiments, the Fund Engine may oversee, facilitate, coordinate and/or direct management of either or both the Fund and RP Fund.

In some embodiments, the Fund Engine may specify investment objectives for the RP Fund such that the RP Fund moderately outperforms the returns of a multi-beta benchmark consisting of a weighted average of specified benchmarks while preserving capital and the ability to make periodic (e.g., monthly) distributions. In one embodiment, the Fund Engine may achieve the specified objectives via allocating the RP Fund's assets between investments that are actively managed and exposed to market risks ("Active Assets) and fixed income investments ("Capital Assets"). In one embodiment, the Active Assets may be comprised of investments grouped by strategy category such as, for example, the following six strategies: Commodities—Enhanced Index Strategy, Emerging Markets Debt Strategy, Emerging Markets Equity Strategy, Global Equity—Enhanced Index Strategy, High Yield Strategy, and US Small Cap Equity—Enhanced Index Strategy. Other strategies and/or categories may be utilized, depending on the implementation.

In one embodiment, the Fund Engine may be implemented such that the Fund's investment program complies with internal, organizational, administrative and/or governmental regulations. In one embodiment, the Fund Engine facilitates the offering of limited liability company membership interests and/or shares ("Units") in the Fund and/or the administration and/or redemption of the Units. Units may be offered and/or restricted to a specific types or types of investor or member. For example, in one embodiment, Units may be offered only to life insurance companies meeting certain requirements, such as those associated with authorized BOLI providers and/or carriers. The Fund Engine may specify investment terms/requirements including amounts, dates, durations, redemptions, and/or the like.

In some embodiments of the Fund Engine, the Fund maintains a separate capital account for each class of Units and for each investor or member. As such, each capital account with respect to a class of Units may be (i) increased by the amount of any contributions in respect of such class, (ii) decreased for any payments in redemption of, or any distributions in respect of, such class (including any fund redemption adjustment and any structuring redemption fee that is specially allocated to the redeeming member), (iii) increased or decreased by such class's allocable share of the appreciation or depreciation of the net assets of the Fund for a specified accounting period, and (iv) decreased by any management fee in respect of such class.

In the above embodiment, for each accounting period, the appreciation or depreciation of the net assets of the Fund (before reduction for any management fee or any structuring redemption fee that is specially allocated to a redeeming member) will be allocated to each class of Units pro rata based upon the relative capital accounts of each class as of the beginning of such accounting period after adjustment for any capital contributions, distributions and redemptions as of the beginning of such accounting period. Each member's capital account with respect to each class of Units may equal the capital account of such class of Units multiplied by the percentage of Units in such class owned by such member. The Fund Engine may adjust capital accounts as appropriate. The NAV of a class of Units may be equal to the capital account balance with respect to such class of Units, and the NAV per Unit of a class may be equal to the NAV of such class divided by the number of outstanding Units of such class.

In one embodiment of the Fund Engine, each member may have the right to redeem some or all of its Units on some specified date or dates and time(s), such as of the close of business on the last business day of each calendar month. In some embodiments, members may have to submit a request or otherwise communicate their intention at an earlier time (e.g., providing notice by the $13^{th}$ day of such month). In some embodiment, for example, the life insurance company embodiment described above, other than redemptions in connection with contract expenses and death benefits, each redemption may be subject to a minimum redemption amount (e.g., $1,000,000), unless such requirement is waived, or the member is redeeming all of its Units. A redemption that would cause the NAV of a member's remaining Units to be less than a specified amount (e.g., $1,000,000), regardless of class, immediately following such redemption may be treated by the Fund Engine as a request for redemption of all of the member's remaining Units in the Fund, unless such a requirement is waived to permit the requested partial redemption. In one embodiment, a member that redeems Units may incur a fund redemption adjustment (e.g., an amount of up to 1.25% of the purchase price of the Units being redeemed, declining linearly over time, such as may be adjusted on a daily basis, to zero over a five year period). In an alternative embodiment, no such fund redemption adjustment is incurred.

A member may not be subject to a fund redemption adjustment to the extent a redemption corresponds to amounts required for the redeeming member to meet obligations in connection with contract expenses, death benefits or contract surrender; provided that such member provides such certifications and documentation with its redemption request as specified by the Fund Engine with regard to the redemption related obligations. The Fund generally expects to satisfy redemptions for contract expenses and death benefits from cash and other liquid assets maintained by the Fund. However, the Fund Engine may, as necessary, redeem notes to satisfy such redemptions, in which case the Fund may incur a structuring redemption fee and/or a note redemption fee. Units of a particular class will be redeemed at a per Unit price based upon the NAV per Unit of such class as of the close of business on the applicable redemption date (taking into account the allocation of any appreciation or depreciation in the net assets of the Fund for the accounting period then ending), after reduction for an allocable portion of any management fee, structuring fee, note redemption fees and any other liabilities of the fund to the extent accrued or otherwise attributable to the Units being redeemed and less any applicable fund redemption adjustment and structuring redemption fees. Each redemption may be subject to the provision by the Fund Engine for all Fund liabilities, and for reserves for estimated accrued expenses, liabilities and contingencies, even if such reserves are not required by U.S. generally accepted accounting principles. The NAV at which Units are redeemed may be adjusted by the Fund Engine, at any time until the proceeds in respect of such redemption are paid. The benefit of any Fund redemption adjustment may be treated as an asset of the Fund, and allocated among each class of Units (e.g., in proportion to their respective capital accounts balances) and all members of each such class (including the redeeming member and in proportion to their respective capital account balances) as of the redemption date.

FIG. 1 shows an implementation of data flow in one embodiment of Fund Engine 101 operation. A Fund Engine Controller 105 may, in one embodiment, serve a central role in acquisition, organization, manipulation, management, transmission, and/or the like of fund allocations, fund requests, buy and/or sell instructions, portfolio queries and/or performance metrics, payment obligations, insurance claim requests, market data, and/or the like. In some implementations, the Fund Engine Controller 105 may be communicatively coupled to one or more external entities. In the illustrated implementation, the Controller 105 is shown in communicative contact with an Insurance Carrier 110 and one or more Note Issuers 115. The Controller 105 is further coupled to a Bank 120 by proxy via the Bank's relationship with the Insurance Carrier 110.

The Fund Engine Controller 105 may further be coupled to modules configured to implement and/or assist with the implementation of particular Fund Engine functions. In the illustrated implementation, the Controller 105 is coupled to an Allocation Module 125. The Allocation Module 125 is configurable to determine appropriate and/or desired allocations of financial resources based on a variety of criteria, as discussed in greater detail below. The Allocation Module 125 may exchange a variety of data with the Controller 105, and/or other Fund Engine components, such as, but not limited to: portfolio allocations, financial resource allocation schedules, structured note allocations, active asset allocation amounts, capital asset allocation amounts, portfolio performance, and/or the like. The Fund Engine Controller 105 may further be coupled to a Portfolio Monitor 130, configurable to monitor, analyze, record, and/or the like the performance, volatility, value, and/or other metrics associated with one or more investment portfolios, funds, securities, and/or other investment vehicles. In one implementation, the Portfolio Monitor 130 may track identities and/or allocations of investment vehicles comprising a given portfolio, retrieve market prices and/or other data values associated with those vehicles, and determine corresponding portfolio NAV, volatility, and/or other performance metrics based thereon. In one implementation, the Portfolio Monitor 130 may be configured to receive portfolio allocation information from the Allocation Module 125 and/or provide portfolio performance metrics to the Allocation Module 125 to aid in the determination of desired allocations of financial resources, such as in accordance with a constant proportion portfolio protection methodology. The Fund Engine Controller 105 may further be coupled to an Account Management Module 135 configurable to effectuate the purchase and sale of a wide variety of investment vehicles such as, but not limited to, equities, debts, derivatives, notes, stocks, preferred shares, bonds, debentures, options, futures, swaps, rights, warrants, commodities, currencies, long and/or short positions, shares of ETFs, and/or other assets or investment interests. Transactions effectuated by the Account Management Module 135 may modify the composition of one or more BOLI Fund(s) 137, comprising structured notes 140 and/or money market instruments 145, and one or more RP Fund(s) 147, comprising Active Asset 150 and Capital Asset 155 investments. In one implementation, the Account Management Module 135 may further be configured to receive portfolio performance information from the Portfolio Monitor 130 and automatically effectuate the purchase and/or sale of investment vehicles based thereon in order to satisfy a set of investment objective criteria, rebalance one or more portfolios, and/or the like. In yet another implementation, the Account Management Module 135 may be configured to interface with one or more account management professionals to provide portfolio performance information and/or receive instructions for and/or implement portfolio adjustments, trades, and/or the like.

The Fund Engine Controller 105 may further be coupled to one or more databases configured to store data pertinent to operation of the Fund Engine. In the illustrated implementation, the Controller 105 is communicatively coupled to a BOLI Funds database 160, which may store data records related to the composition, performance, history, ownership and/or management, payment obligations, and/or the like associated with one or more BOLI Funds managed by and/or associated with the Fund Engine. The Controller 105 may further be coupled to one or more RP Fund databases, configured to store data records related to the composition, performance, history, ownership and/or management, payment obligations, and/or the like associated with one or more RP Funds managed by and/or associated with the Fund Engine.

Figure 2:
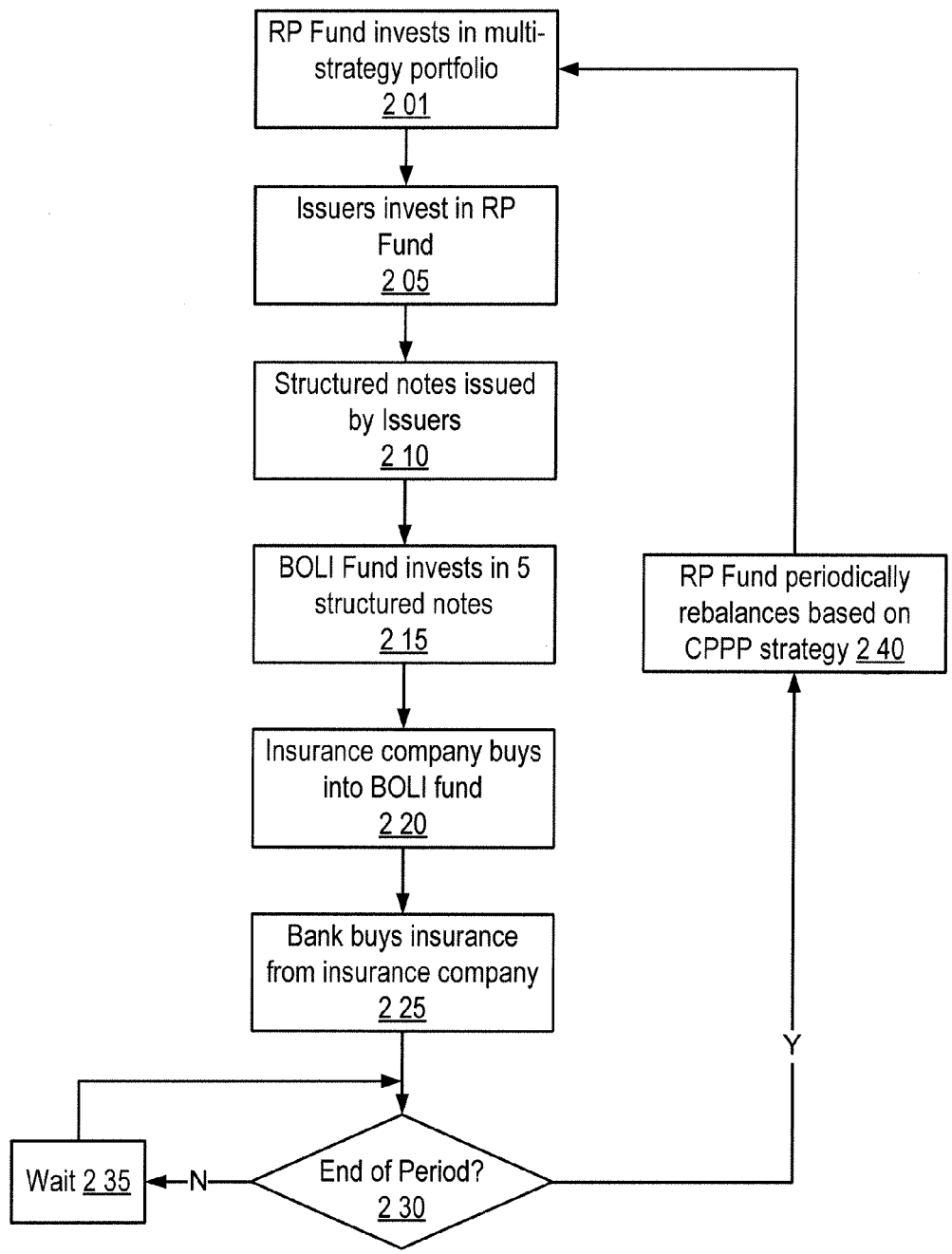
FIG. 2 shows an implementation of overall logic flow in one embodiment of Fund Engine operation.

FIG. 2 shows an implementation of overall logic flow in one embodiment of Fund Engine operation. The Fund Engine may determine an initial multi-strategy portfolio in which to invest RP Fund assets 201. In one implementation, the multi-strategy portfolio may comprise an initial allocation of fund resources to active assets, comprising higher risk and/or return investment vehicles, and to capital assets, comprising assets with decreased risk such as money market funds, interest rate swaps, and/or the like. Shares of the RP Fund may be subsequently provided to one or more note issuers for investment 205 in support of a plurality of structured notes that they issue 210. The Fund Engine may then determine an allocation of BOLI Fund resources to a plurality (e.g., five) of the structured notes 215. In one implementation, the BOLI Fund may reserve some resources to invest in money market instruments and/or other capital assets in addition to the structured notes. Shares of the BOLI Fund may then be provided as investment interests to one or more insurance carriers 220 in support of insurance policies that the carriers may provide to other entities such as, for example, to one or more banks 225. A determination may be made as to whether the end of a particular portfolio rebalancing and/or reallocation period has been reached 230. If not, then the Fund Engine may wait 235 until the end of the period. Once a period has reached completion, the Fund Engine may assess RP Fund portfolio performance and/or rebalance RP Fund resources between active and/or capital assets in accordance with a Constant Proportion Portfolio Protection calculation methodology (the "CPPP Methodology") 240, which is described in greater detail below.

Figure 3:
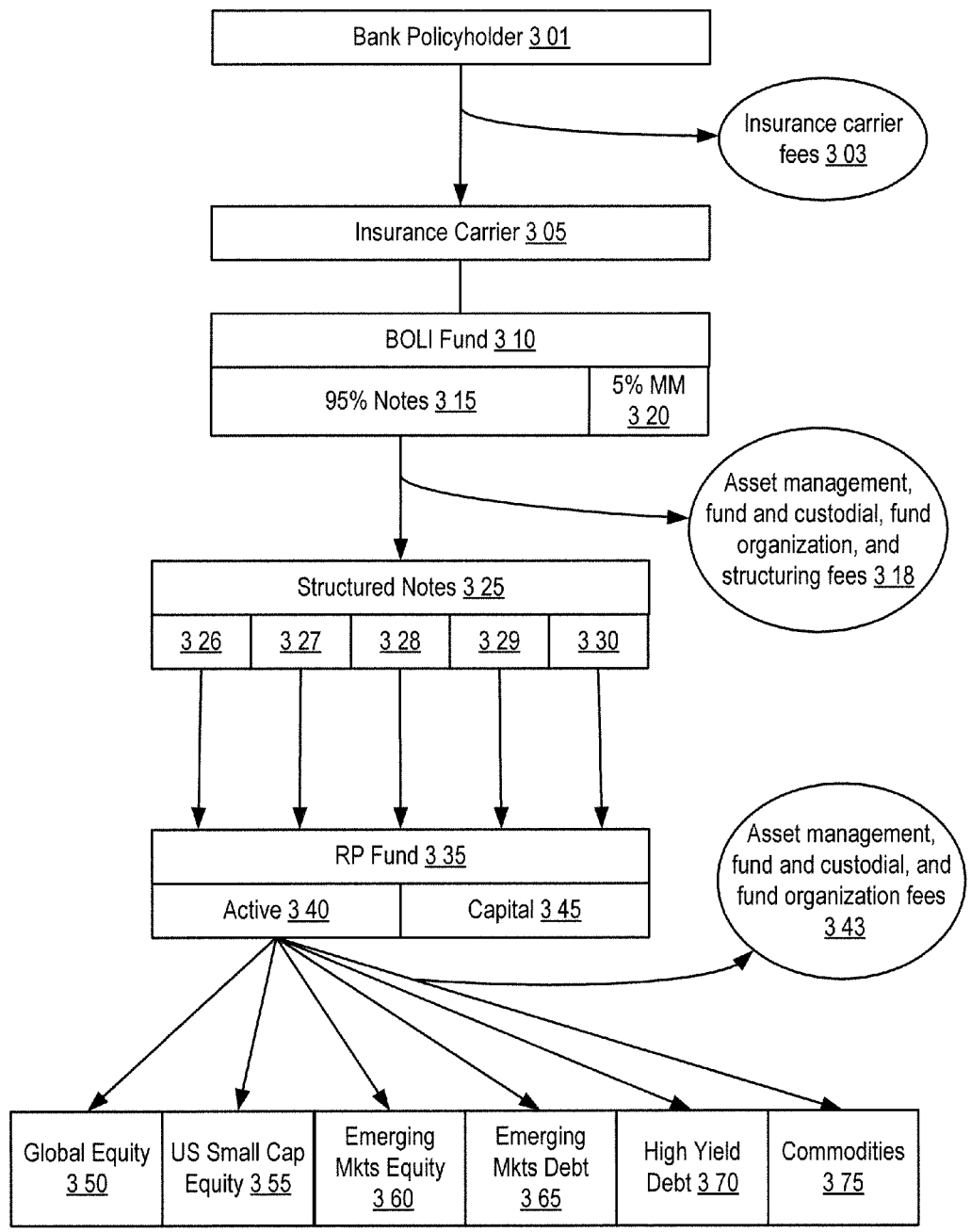
FIG. 3 shows an implementation of resource flow between participating entities and investment vehicles in one embodiment of Fund Engine operation.

FIG. 3 shows an implementation of resource flow between participating entities and investment vehicles in one embodiment of Fund Engine operation. A Bank Policyholder 301 may originate financial resources in the purchase of one or more insurance policies from an Insurance Carrier 305. A portion of those financial resources may go towards payment of insurance carrier fees 303, and the remainder may be invested in one or more BOLI Funds 310, comprising an allocation between structured note investments 315 and capital assets (e.g., money market instruments) 320. In the illustrated implementation, the BOLI Fund allocation comprises 95% structured note investments and 5% money market investments. In one implementation, a portion of BOLI Fund resources may also be put towards the payment of asset management fees, fund and custodial fees, fund organization fees, and/or structuring fees associated with the plurality of structured notes in which the BOLI Fund is invested 318. The BOLI Fund's structured note investment component 325 may comprise a plurality of structured notes, which number five in the illustrated implementation (326, 327, 328, 329, 330), though other numbers of structured notes are contemplated as comprising this component of the BOLI Fund in alternative implementations. Each structured note, in turn, may be backed by an investment in shares of one or more RP Funds 335. In one implementation, all structured notes in which the BOLI Fund is invested may be backed by investments in shares of the same RP Fund while, in an alternative implementation, different structured notes may be backed by investments in shares of different RP Funds. Within the RP Fund, resources may be allocated between a collection of active assets 340 and/or a collection of capital assets 345, wherein the relative allocation of resources between these two asset classes may be based in some part on a CPPP methodology. Active asset resources may, in turn, be allocated to a variety of different asset classes consistent with the investment objectives and/or strategies of the active asset group. In the illustrated implementation, active asset resources are distributed among different asset classes that include global equity assets 350, US small cap equity assets 355, emerging markets equity 360, emerging markets debt 365, high yield debt 370, commodities 375, and/or the like. A portion of active asset resources may further be put towards asset management fees, fund and custodial fees, fund organization fees, and/or the like 343.

Figure 4:
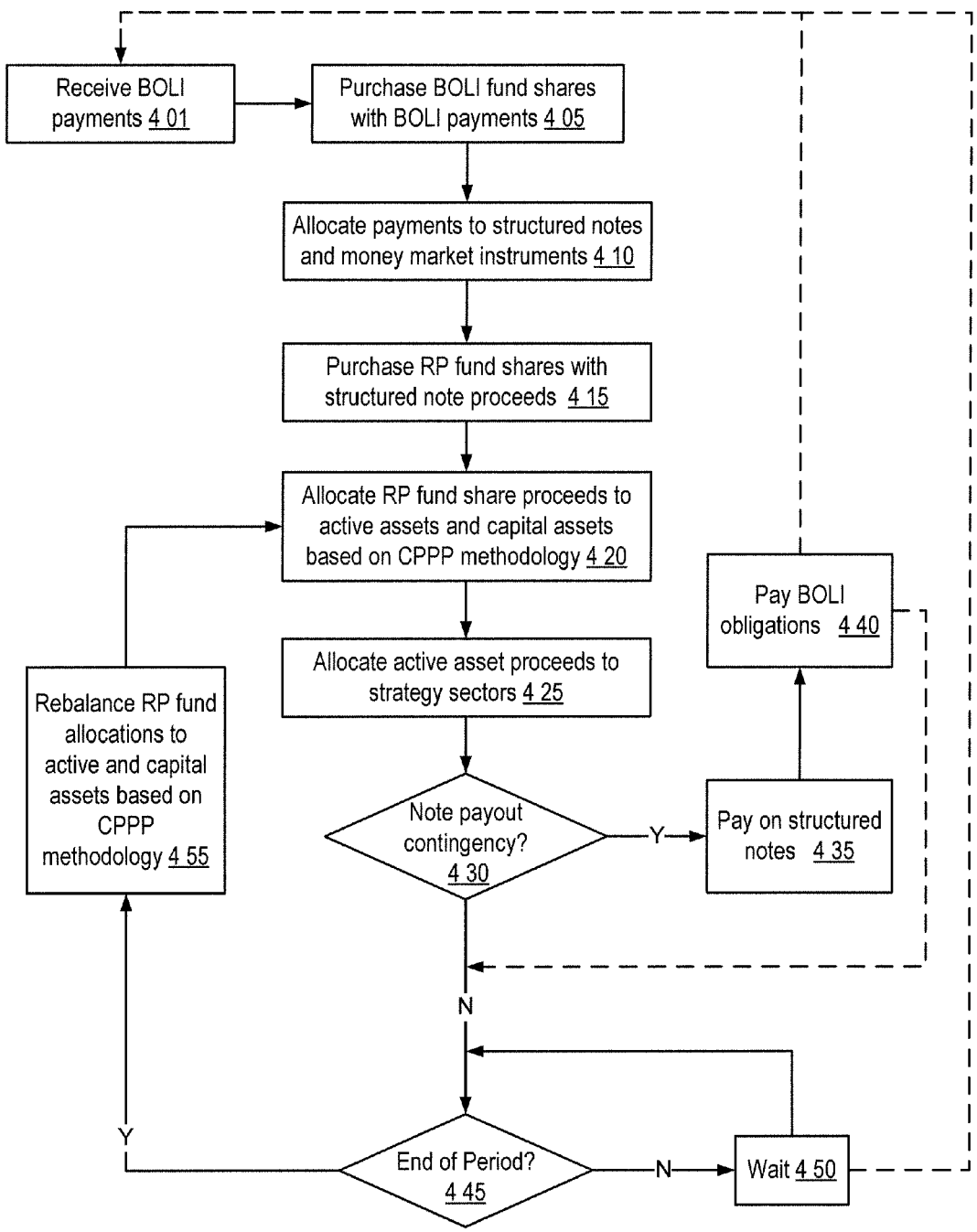
FIG. 4 shows an implementation of logic flow for resource flow and allocation in another embodiment of Fund Engine operation.

FIG. 4 shows an implementation of logic flow for resource flow and allocation in another embodiment of Fund Engine operation. A Fund Engine and/or Fund Engine associated agency, such as a life insurance company, may receive BOLI payments 401 in exchange for providing appropriate insurance coverage. The BOLI payments or some subset thereof may then be used to purchase shares of a BOLI fund 405, which comprise some allocation of fund resources between investments in a collection of structured notes and one or more money market instruments 410. Resources allocated to the purchase of structured notes, or some subset thereof, may then be used to purchase shares of one or more RP Funds 415, which comprise some allocation of fund resources between investments in active and capital assets 420. This allocation may, in one implementation, be based on a CPPP methodology. Within the active asset allocation, the Fund Engine and/or one or more Fund Engine administrators may further allocate resources between a variety of different strategy sectors such as, but not limited to, global equity, U.S. small cap equity, emerging markets equity, emerging markets debt, high yield debt, commodities, and/or the like. A determination may be made as to whether a note-payout contingency has transpired 430, and an instruction may be issued whereby a Fund Engine and/or Fund Engine associated agency, such as a life insurance company, may be obligated to pay a sum of money, for example, to a BOLI policy holder. One example of a note-payout contingency may be the death of an employee of a bank holding a BOLI insurance policy. Accordingly, payment may be supplied on the structured notes backing the BOLI policy 435, and the BOLI policy issuer may then pay its obligations with the received payout resources 440. The flow may then return to receive additional BOLI policy payments and/or continue to 445 to determine whether the end of a rebalancing period has been reached 445. If the end has not been reached, the Fund Engine flow may wait 450 and/or receive additional BOLI policy payments 401. Once the end of a rebalancing period has been reached, the Fund Engine may rebalance RP Fund allocations between active and capital assets, such as in accordance with a CPPP methodology 455.

Notes

As discussed above, the Fund Engine may require that a note or notes purchased for a Fund meet certain specified criteria. However, it should be noted that some embodiments may be configured to allow the purchase of notes that do not meet the specified terms provided indicated approvals are given (e.g., from an administrator of the Fund Engine and/or Investment Manager). As discussed above, returns on notes may be based upon the performance of the RP Fund. The notes may be senior unsecured obligations of the issuers and may rank pari passu with all other such obligations of such issuer. The Fund Engine and/or an associated administrator or user, such as an Investment Manager may select the Issuers based on adherence to specified guidelines and/or parameters (e.g., as described in the Diversification Requirements below), where each Issuer is a foreign or U.S. bank or other financial institution or a branch or affiliate of the foregoing; and each Issuer (and/or any guarantor affiliate of an Issuer) has an appropriate rating for other senior unsubordinated debt (e.g., from Moody's or S&P of at least Aa3 or AA-, respectively). In an alternative embodiment, the notes may be issued by one or more special purpose vehicles ("SPVs") and/or special purpose entities ("SPEs"). Note issuing SPVs and/or SPEs may be backed and/or guaranteed by one or more issuers with an appropriate rating for other senior unsubordinated debt.

In some embodiments, the Fund Engine (and/or an associated administrator or user) may retain or redeem notes that fall below the foregoing rating criteria following their purchase. The Fund Engine may redeem notes that fall below investment grade if, based on an appropriate analysis, it is indicated to do so in light of the investment objective of the Fund, and early redemption fees may apply in connection with certain redemptions prior to the note maturity date. Any such redemption fees may materially adversely affect the Fund's performance. In some embodiments, notes may be issued only at specified amounts (e.g., notes may only be issued in denominations of $1,000,000).

Interest Payments and Payments at Maturity

In some embodiments, the Fund may be entitled to receive periodic payments for each note. For example, in one embodiment, on a monthly basis, such as on the 28th day of each month until the note maturity date (or if such day is not a business day, the next business day) (each, a "note payment date"), the Fund may be entitled to receive with respect to each note interest payments (the "interest") equal to the protected amount (as defined below) then in effect multiplied by one-twelfth of 1.00%. Moreover, the Fund may also be entitled to receive contingent coupon amounts ("contingent coupon") on a note Payment Date based on a fund NAV. For example, with respect to each note, contingent coupon amounts ("contingent coupon") may equal to the sum of (a) the Variable Fund Distribution (as defined below in RP Fund—Distributions) distributed by the RP Fund during the prior month, if any, multiplied by the number of RP Units (as defined below) underlying the relevant note, plus (b) the product of one-twelfth of (i) the Base Rate (also defined below) minus the Base Rate as of the Settlement Date of the note (the "Reference Rate") multiplied by (ii) the Protected Unit Value multiplied by (iii) the number of RP Units underlying the note.

In some embodiments of the Fund Engine, on the note maturity date (unless a Market Disruption Event is continuing), the Fund may be entitled to receive in respect of each note an amount equal to the greater of (a) the product of the par value of the note and the Protected Level (as defined below) (the "Protected Amount") and (b) the par value of the note multiplied by the Index Level (as defined below) determined at around the twentieth anniversary of the RP Fund's commencement of operations occurs (the "RP Final Scheduled Distribution Date") in each case, plus any accrued and unpaid Interest and Contingent Coupon.

In some embodiments, the "Index Level" with respect to a note is initially 100% on the date of issuance of such note (the "Settlement Date"). Thereafter the Index Level with respect to a note, on any day, may equal the quotient of (i) the NAV per unit of limited liability company membership interests in the RP Fund ("RP Units") calculated as of the close of business on such day (e.g., as determined by the Fund Engine and/or an associated administrator or user, such as an Investment Manager) over (ii) the NAV per RP Unit (the "RP Unit Value") on the Settlement Date. Following the dissolution of the RP Fund, the Index Level will be 0% with respect to all notes. Following the election of an Issuer to make an interim payout under a note, the Index Level will be 0% with respect to the applicable notes.

In some embodiments of the Fund Engine, the "Protected Level" will equal, on any day, the quotient of (i) the Protected Unit Value (as defined below) as of such day over (ii) $100 (or the like), which shall be the RP Unit Value on the initial issuance date of RP Units.

In some embodiments, the "Protected Unit Value" will equal, on any day, the lesser of (i) the highest RP Unit Value achieved on any RP Calculation Date that has occurred prior to the earlier of such day and the last business day of the month during which the second anniversary of the RP Fund's commencement of operations, or other specified time period of different length, occurs or on the date RP Units are initially issued and (ii) $125 per RP Unit (or the like). An "RP Calculation Date" shall be the close of business on the last business day of each calendar month, subject to a Market Disruption Event.

In some embodiment, the Fund Engine may be configured to respond to Market Disruption Events. A Market Disruption Event will be deemed to have occurred if the Fund Engine and/or appropriate user (e.g., a managing member of the RP Fund) (i) suspends reporting of the RP Fund NAV; (ii) suspends redemption of any RP Unit or suspends or delays payment in full of the redemption price of any RP Unit; or (iii) suspends or delays payment in full of any Base Fund Distribution. Notwithstanding a Market Disruption Event, on the note maturity date the Fund will be entitled to receive, with respect to each note, the Protected Amount and the Interest. The Fund may also be entitled to receive additional amounts in excess of the Protected Amount and the Interest that correspond to subsequent distributions made by the RP Fund in respect of the RP Units, subject to the following conditions. To the extent the distributions in respect of the RP Units on the RP Final Scheduled Distribution Date are less than the Protected Unit Value and the Base Fund Distribution, the Issuer may be entitled to reduce such additional amounts by the unpaid portion of the Protected Unit Value and the Base Fund Distribution with interest thereon. In some embodiments, on or after the note maturity date, the Fund may not be entitled to any such additional amounts for various reasons, including without limitation, the performance of the RP Fund or failure of the RP Fund to make distributions or payments in respect of the RP Units when scheduled. In some implementations, amounts received after such a delay may be reduced by a finance charge.

In some embodiments of the Fund Engine, if the RP Fund dissolves prior to the note maturity date for any reason, the Issuer may pay an interim amount (if any), following the date the RP Fund pays final distributions in connection with such dissolution (the "RP Fund Dissolution Date") equal to the excess of: (a) the note valuation over (b) the present value, as computed on the bid-market U.S. dollar interest rate swap curve without any spread, of a hypothetical bond (the "Bond"), issued by the Issuer, with a principal amount equal to the Protected Amount as of such date, maturing on the note maturity date and paying monthly interest of (i) if the RP Fund is dissolved pursuant to a vote of its members, 1.00% per annum and (ii) in any other case, the Reference Rate on the Protected Amount on the $28^{th}$ day of each month. Following the dissolution of the RP Fund, the notes will no longer be valued by reference to the RP Fund.

In one embodiment of the Fund Engine, in connection with the occurrence of any of the following events, an Issuer may have the option to make an interim payment under the notes as described above (e.g., with the Bond calculated based upon (i) above): 1) Insolvency of the RP Fund; 2) Upon a determination of the Fund Engine (and/or associated user, e.g., an Investment Manager) that the RP Fund has not met the Minimum Capital Assets Allocation, the minimum required allocation to Eligible Swaps, the Strategic Allocation for any Active Asset Strategy or, for 60 consecutive days, the Tracking Error Limit for any Active Asset Strategy (each based on estimates as of the close of business on any business day) and notification that the RP Fund has been unable to rectify the situation within five consecutive business days of such determination; 3) Failure by the RP Fund to report the RP Unit Value for a period of 30 consecutive days after the applicable RP Calculation Date; 4) removal of investment manager of the RP Fund unless replaced with an approved affiliate; 5) Modification of the private placement memorandum of the RP Fund that may be adverse to the value of the RP Units; 6) The occurrence of a mandatory redemption of RP Units by the RP Fund in respect of RP Units held by the Issuer or any inability of the Issuer to hedge its exposure under a note despite commercially reasonable efforts; and 7) Any cancellation, suspension or revocation of requisite registrations or approvals of the RP Fund by any governmental, legal or regulatory entity with authority and jurisdiction over the RP Fund.

Following any interim payment under a note as described above, such notes may no longer be valued by reference to the RP Fund. The Fund Engine may be configured such that interim payment is to be paid promptly following the date on which the RP Fund (a) makes distributions in respect of any such liquidation or (b) pays redemption proceeds, as applicable, in respect of any such notes. In one implementation, the notes will not be obligated to pay the Fund interest in respect of any interim payment. Notwithstanding any interim payment under a note, the Fund may continue to be entitled to receive the Interest on the notes and, on the note maturity date, the Fund may be entitled to receive the Interest and the Protected Amount. However, the Fund may not be entitled to receive any additional amounts in respect of the notes. Depending on the particular embodiment, the Fund Engine (and/or an associated user) may retain or redeem notes that are no longer valued by reference to the RP Fund. If the Fund redeems such notes, it will incur the applicable structuring redemption fees and note redemption fees. In the event that the Fund incurs redemption fees by redeeming such notes or the portion of the Fund's investments in notes that are valued by reference to the RP Fund decreases, the Fund's performance may be adversely affected.

Redemptions of Notes

In many embodiments of the Fund Engine, except during a Market Disruption Event, notes may be redeemed periodically in specified denominations, for example, monthly, in minimum denominations of $1,000,000, on the 25th day of any calendar month (the "Optional Early Redemption Date") by notifying the Issuer by a given day; provided that the Fund submits an irrevocable redemption request to the Issuer specifying the par value of notes to be redeemed. On the Optional Early Redemption Date, the Fund may be entitled to receive (i) the note valuation with respect to the notes to be redeemed as of the RP Calculation Date immediately preceding the Optional Early Redemption Date minus (ii) the applicable note Redemption Fee (as defined below). Note redemption rights may be suspended during a Market Disruption Event.

In connection with each note redeemed prior to a specified limit time (e.g., the fifth anniversary of the issuance of such note), the Fund may incur an early redemption fee (the "note redemption fee") equal to some percentage (e.g., 1.25%) of the par value of the note being redeemed, which may, in some embodiments, decline linearly (on a daily basis) to zero on the fifth anniversary of the date of issuance of the notes. In some embodiments, no note redemption fee will be charged by the Issuer when the Fund Engine and/or an associated administrator or user, such as an Investment Manager, requests a redemption in connection with a Contract Surrender. Any note redemption fee may reduce the net assets of the Fund and may be borne by all of the members (including the redeeming member). In some embodiments of the Fund Engine, the Fund Redemption Adjustment in respect of a redeeming member may be specified to offset any note redemption fee that will apply as a result of such redemption. There may be circumstances, however, when a note redemption fee exceeds the corresponding Fund Redemption Adjustment, including when no corresponding Fund Redemption Adjustment has been made in respect of a redeeming member. In any such circumstances, such excess may result in a reduction in the net assets of the Fund, and as a result, may be borne by all members. In some embodiments of the Fund Engine, the note valuation on any Optional Early Redemption Date may depend on the value of the RP Fund but may be as low as the applicable Bond present value as of such date. Consequently, the return on such notes may be less, and perhaps significantly less, than the par value of the notes. In some embodiments, restrictions may be implemented as to what entities are permitted to hold notes.

In some embodiments of the Fund Engine, the Issuers and/or their affiliates (the "Issuer Affiliates") may purchase RP Units or to enter into transactions to otherwise hedge, as described below. For example, Issuers and Issuer Affiliates may hedge certain risks under the notes including where the RP Fund fails to pay the Base Fund Distribution or the RP Unit Value is less than the Protected Unit Value on the RP Final Scheduled Distribution Date.

RP Fund

As discussed above, in some embodiments of the Fund Engine, the RP Fund's investment objective is to outperform the returns of a multi-beta benchmark consisting of a weighted average of specified benchmarks (e.g., as described in Active Asset Strategies below) while preserving capital and making periodic (e.g., monthly) distributions to its members.

The Fund Engine (and/or associated users) may achieve the RP Fund's objective by employing a CPPP methodology that allocates the RP Fund's assets, net of any fees and expenses, between investments that are actively managed and exposed to market risks (the "Active Assets") and fixed income investments (the "Capital Assets"). The CPPP methodology may also be referred to as a Constant Proportion Portfolio Insurance in some implementations.

Figure 5A:
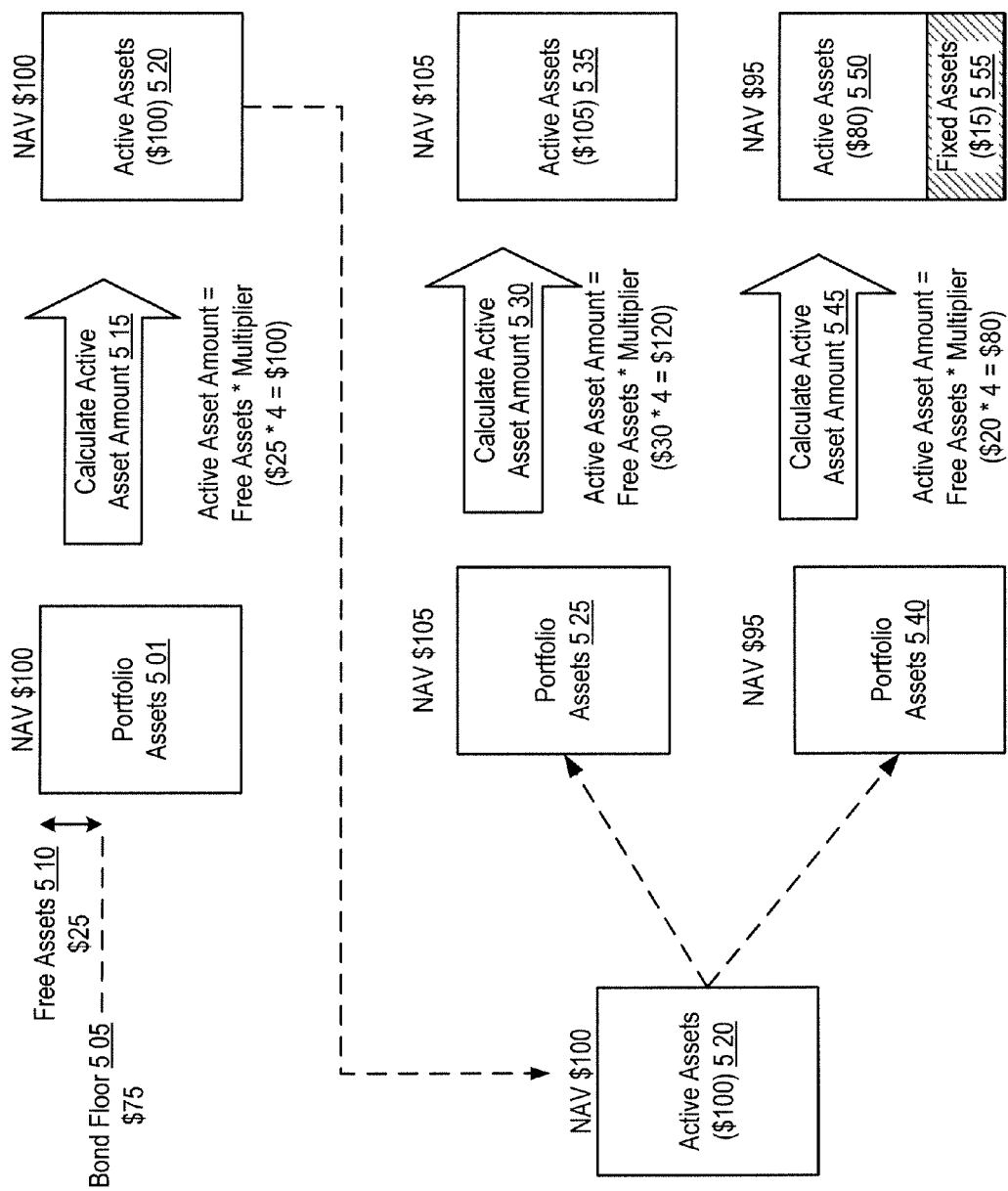
FIG. 5A shows an implementation of resource flow for CPPP methodology-based RP Fund resource allocation in one embodiment of Fund Engine operation.

FIG. 5A shows an implementation of resource flow for CPPP methodology-based RP Fund asset allocation in one embodiment of Fund Engine operation. A CPPP methodology may comprise a dynamic trading strategy and/or path-dependent structure that rebalances between active assets and capital assets to ensure that the combined value of both assets is sufficient at any time to back obligations of one or more structured notes backed by RP Fund shares, to pay a protected principal amount, to buy a zero-coupon bond that pays a protected principal amount at maturity, and/or the like. RP Portfolio assets 501 in the illustrated implementation begin with an initial NAV of $100. A bond floor of $75 is set 505, leaving $25 of free assets 510 as the difference between the NAV and the bond floor. A bond floor may be set to ensure protection of principal and/or the present value of liabilities in the structure. For example, a structured note backing a BOLI insurance policy may be required, such as by laws and/or regulations, to maintain a reserve of principal to cover payout contingencies for BOLI policy holders. In one implementation, a bond floor may comprise the price of a zero-coupon bond with a face value equal to the structured note's liabilities and/or payout obligations. The free assets 510 may then be used to calculate the amount of RP Fund assets to be allocated to an active asset portfolio 515. To determine the allocation, the free asset amount is multiplied by a pre-set multiplier coefficient (hereinafter, "multiplier"). In one implementation, the multiplier comprises an expression of the riskiness of the active asset portfolio. For example, the multiplier may be set to 100 divided by a "crash size" percentage, that is an upper-limit percentage that is being insured against. In the illustrated implementation, the multiplier is set to 4 (i.e., insuring against a crash size of 25%), so the allocation to an active asset portfolio 520 is given by $25*4=$100.

The illustrated example next assumes two possible outcomes of active asset portfolio performance to showcase how the RP Fund portfolio allocation may vary according to the CPPP methodology. In the first outcome, the active asset portfolio gains 5%, resulting in a NAV of the portfolio assets 525 of $105. Subtracting the bond floor, $75, from this NAV then yields a free asset amount of $30 which, when multiplied by the multiplier, yields an active asset allocation of $120 530. This exceeds the total NAV of the portfolio assets, so instead of allocating $120 to the active asset portfolio, the Fund Engine allocates the full NAV of the portfolio assets, $105, to the active asset portfolio 535 in this round of rebalancing.

In the second outcome, the active asset portfolio loses 5%, resulting in a NAV of the portfolio assets 540 of $95. Subtracting the bond floor, $75, from this NAV yields a free asset amount of $20 which, when multiplied by the multiplier, yields an active asset allocation of $80 545. This is less than the total NAV of the portfolio assets. Accordingly, $80 of the portfolio assets NAV is allocated to active assets 550, and the remainder of $15 is allocated fixed and/or capital assets 555. The fixed and/or capital assets comprise assets with decreased risk, such as money market funds, interest rate swaps, and/or the like, and portfolio assets may be increasingly allocated to such lower-risk assets during rebalancing if the active asset portfolio performs poorly. On the other hand, well performing active asset portfolios may draw more RP Fund portfolio assets to themselves, as illustrated by the example at 525, 530, and 535.

In one implementation, the bond floor may be fixed from one rebalancing period to the next. In an alternative implementation, the bond floor may be adjusted from one rebalancing period to the next as needed to satisfy and/or accomplish RP Fund goals, requirements, regulations, and/or the like. For example, in one implementation, the bond floor may rise towards the protected amount as time passes, tantamount to the rise in price of a zero-coupon bond towards 100% of the bond's face value as the bond approaches maturity.

Figure 5B:
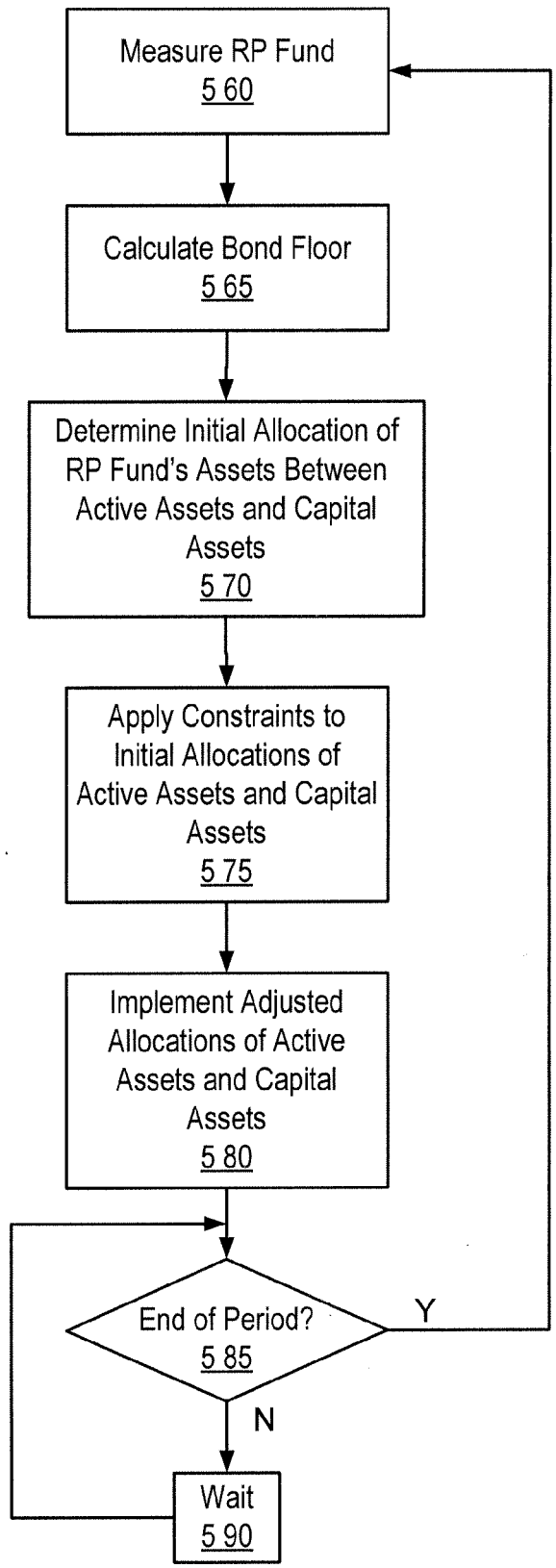
FIG. 5B shows an implementation of logic flow for CPPP methodology-based RP Fund asset allocation in one embodiment of Fund Engine operation.

FIG. 5B shows an implementation of logic flow for CPPP methodology-based RP Fund resource allocation in one embodiment of Fund Engine operation. In one implementation, the CPPP Methodology may measure the value of the RP Fund relative to a hypothetical bond floor (the "Floor") (calculated as described below) to determine the allocation of the RP Fund's assets between Active Assets and Capital Assets on a periodic (e.g., daily) basis. As shown in FIG. 5B, the Fund Engine may measure the RP Fund 560 and calculate the bond floor 565 in order to determine the initial allocations of the RP Fund's assets between Active Assets and Capital Assets 570. The Fund Engine may then apply constraints (as discussed below and in Appendix A) to the initial allocations of Active Assets and Capital Assets 575. The Fund Engine may then implement the adjusted allocations of Active Assets and Capital Assets 580, and at the indicated period 585, cycle again, or otherwise wait 590. The RP Fund will endeavor to maintain an allocation of Fund investments to Capital Assets that meets or exceeds a minimum allocation to the Capital Assets (the "Minimum Capital Assets Allocation"), such that, for one example embodiment, as of any date shall be at least (i) the NAV of the RP Fund (the "RP Fund NAV") less (ii) four times the difference of (a) the RP Fund NAV and (b) 105% of the Floor; provided that if such amount is not a positive amount, the Minimum Capital Assets Allocation required shall be zero. Pursuant to the CPPP Methodology, as the RP Fund NAV approaches the Floor, the Minimum Capital Assets Allocation will increase. Conversely, as the RP Fund NAV increases relative to the Floor, the Minimum Capital Assets Allocation may decrease.

In one embodiment, the Floor as of any date shall equal the present value (e.g., calculated on the bid-market U.S. dollar interest rate swap curve with no spread) of the sum of (i) a stream of payments at a rate equal to one-twelfth of the Base Rate of the Protected Unit Value multiplied by the outstanding number of RP Units payable monthly on the $23^{rd}$ day of each month until the RP Final Scheduled Distribution Date, and (ii) the aggregate number of outstanding RP Units as of the Floor calculation date (adjusted to reflect subscriptions and redemptions prior to such date) multiplied by the Protected Unit Value assuming that it was paid on the last day of the month during which the twentieth anniversary of the RP Fund's commencement of operations occurs. To the extent that the Base Rate is increased, as described below in Distributions, the Floor will increase and may result in the Fund Engine (and/or an associated user such as an Investment Manager) maintaining a higher allocation to Capital Assets than it would have in the absence of such increase.

Pursuant to the CPPP Methodology, in some embodiments, the Fund Engine (and/or associated user) may be configured to have the RP Unit Value as of the RP Final Scheduled Distribution Date be at least equal to the Protected Unit Value. In allocating the RP Fund's assets, the Fund Engine may be configured to maintain the RP Fund's volatility level below a specified volatility level or "Volatility Cap" (e.g., 10.5%).

The Fund Engine and/or associated user, such as an Investment Manager, may monitor and/or attempt to manage the RP Fund's volatility level (the "RP Fund Volatility Level") on a periodic (e.g., monthly) basis by evaluating the historical volatility levels of the RP Fund's assets in connection with constructing the RP Fund's portfolio and by reviewing the RP Fund Volatility Levels and managing the RP Fund Volatility Level on an ongoing basis. The RP Fund Volatility Level may be determined as the annualized standard deviation of monthly change in the RP Fund NAV on a trailing time period (e.g., twelve-month) basis based on estimates of the NAVs of and other information regarding the RP Fund's investments as of the close of business on the last business day of each sub-period (e.g., calendar month). In one embodiment, if there is limited actual data to calculate a rolling periodic (e.g., twelve-month) figure on the actual allocation of the RP Fund's assets, the rolling determination/computation may, to the extent necessary to perform such computation, incorporate a pro-forma calculation, as if the RP Fund's assets were allocated during the applicable period in accordance with the allocation at the time of computation.

Figure 6:
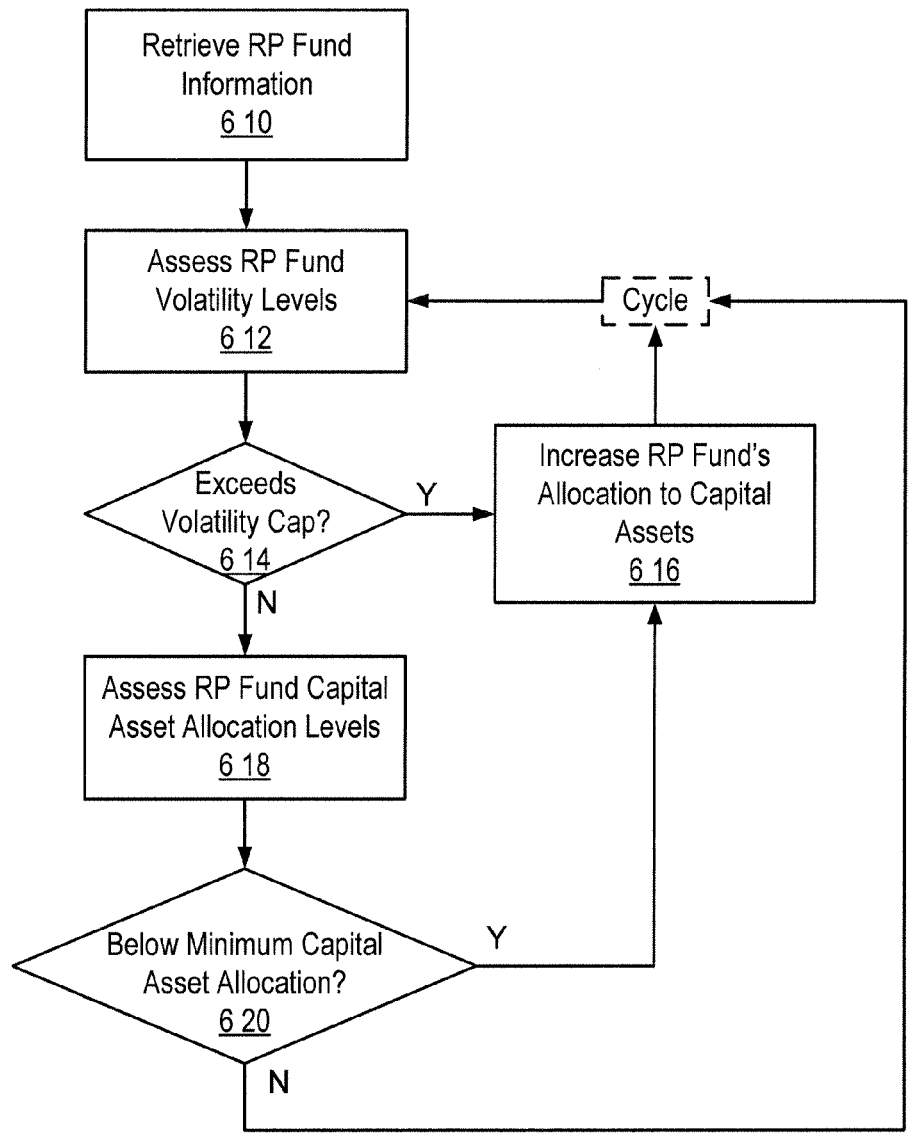
FIG. 6 shows an implementation of logic flow for RP Fund asset allocation in another embodiment of Fund Engine operation.

In one embodiment, as illustrated by the flow diagram in FIG. 6, after the RP Fund is populated 610, the Fund Engine assess the RP Fund's volatility levels 612 (in some embodiments periodically, while in other embodiments continuously). If the RP Fund Volatility Level is determined to have exceeded the Volatility Cap 614, the Fund Engine (and/or associated user) may take action to increase the RP Fund's allocation to Capital Assets 616, in order to reduce the RP Fund Volatility Level below the Volatility Cap, such that, for example, had the same allocation been applied to the RP Fund on a trailing twelve-month basis, it would have resulted in the RP Fund Volatility Level being at or below a specified level (e.g., 10%).

The Fund Engine may endeavor to maintain an allocation of Fund investments to Capital Assets that meets or exceeds the Minimum Capital Assets Allocation at all times. The Fund Engine may Assess the RP Fund Capital Asset Allocation Levels 618 and if they are determined to be below the Minimum Capital Assets Allocation 620, action may be taken to increase the RP Fund's allocation to Capital Assets 616 and the assessment may be performed again 612. The ability of the Fund Engine (and/or associated user) to maintain the Minimum Capital Assets Allocation may be limited by restrictions related to the purchase or liquidity of the RP Fund's investments. In some embodiments of the Fund Engine, if the Minimum Capital Assets Allocation exceeds a specified threshold (e.g., 95% of the RP Fund NAV) (the "RP Fund Dissolution Event"), the RP Fund may be dissolved and may make liquidation distributions.

In some embodiments, the Fund Engine may be configured to manage the portfolio such that as of a specified period (e.g., each calendar quarter-end) no more than a specified amount (e.g., 20%) of the RP Fund's assets are allocated to any single issuer of a security or investment instrument. In the event that the Fund Engine and/or associated administrator or user determines that more than the specified amount (e.g., 20%) of the RP Fund's assets are allocated to any single issuer as of the specified period (e.g., the end of a calendar quarter), the Fund Engine may seek to reduce any such allocation to below the specified amount (20%) within a indicated time frame (e.g., 30 days of the calendar quarter-end).

With respect to direct investments by the RP Fund, the Fund Engine (and/or an associated user, such as an Investment Manager) may be tasked to maintain a primarily liquid investment portfolio and may not indicate that a significant portion of the RP Fund will be invested in securities and other investments that may be thinly traded in normal market conditions, or that have historically been subject to long and frequent periods of illiquidity. With respect to investments by the RP Fund in Pooled Investment Vehicles (as defined below), the Fund Engine may, in some embodiments, only invest in Pooled Investment Vehicles that offer daily liquidity in the ordinary course of their business.

Active Assets

As discussed above, Active Assets may be comprised of investments grouped according to implemented strategies (such as the six Active Asset Strategies discussed above. Each Active Asset Strategy may have its own particular investment program, including a defined investment objective, and may be subject to certain investment guidelines and restrictions, as discussed in below in Active Asset Strategies. In some embodiments, the Fund Engine may be configured with (and/or supplied with from one or more Fund Engine users) target allocations (the "Strategic Targets") and target allocation ranges (the "Strategic Allocations"), each expressed as a percentage of the Active Asset's NAV, and will allocate to the Active Asset Strategies accordingly, as illustrated for one implementation by the table below. It is to be understood that alternative Active Asset Strategies, strategic targets, and strategic allocations are contemplated as being within the scope of the Fund Engine's functional capabilities. For example, in one alternative implementation, Fund Engine associated Active Assets may further comprise hedge fund investments.

| Active Asset Strategy | Strategic Target | Strategic Allocation |
| --- | --- | --- |
| Commodities Strategy | 10% | 8-13% |
| Emerging Markets Debt Strategy | 13% | 11-16% |
| Emerging Markets Equity Strategy | 5% | 3-7% |
| Global Equity Strategy | 60% | 55-65% |
| High Yield Strategy | 7% | 5-9% |
| US Small Cap Equity Strategy | 5% | 3-7% |

In one embodiment, the Strategic Targets and the Strategic Allocations are fixed and not subject to adjustment. Accordingly, the Fund Engine and/or associated user may have no discretion to overweight or underweight the RP Fund's allocation to any Active Asset Strategy and will rebalance the RP Fund's allocations to the Active Asset Strategies (as described in Rebalancing the Active Asset Strategies below) notwithstanding the relative investment performance of the Active Asset Strategies from time to time.

In some implementations, within each Active Asset Strategy, the Fund Engine may invest through separate accounts ("RP Separate Accounts") or pooled investment vehicles managed by the Fund Engine and/or associated users (e.g., Investment Managers), an affiliate thereof or a third party adviser ("Pooled Investment Vehicles"), such as investment companies registered under the Investment Company Act ("Registered Investment Funds"). A list of the investments that may be included in each Active Asset Strategy is set forth in Active Asset Strategies below.

In some embodiments, RP Separate Accounts are not separate entities, but categories of assets, all of which are held by the RP Fund. As such, related references herein such as "securities traded for the RP Fund" and references to a specific RP Separate Account may be construed accordingly. In one embodiment, the classification that a Pooled Investment Vehicle is within a particular Active Asset Strategy may be made by the Fund Engine in reliance on information provided by the manager of such Pooled Investment Vehicle.

In some embodiments, the Fund Engine and/or an associated user such as an Investment Manager may elect to invest in Registered Investment Funds managed by Fund Engine, the Investment Manager or an advisory affiliate thereof. In some embodiments, the RP Fund may access the Active Asset Strategies through investments in other Pooled Investment Vehicles (e.g., an investment company with variable share capital incorporated under the laws of the Grand Duchy of Luxembourg as a public limited company, which is an "umbrella fund" enabling investors to choose between one or more investment objectives by investing in one or more separate investment portfolios). With respect to the RP Fund's investment in any such portfolio, management fees may be charged to the RP Fund but may be rebated to the RP Fund pursuant to an agreement entered into by the RP Fund.

In some embodiments, the Fund Engine and/or an associated user may elect to replace all or any portion of an Active Asset Strategy, provided that the replacement strategy is limited to the same asset classes as the replaced strategy and seeks to outperform its respective benchmark. The replacement strategy may seek to outperform a different benchmark than the original Active Asset Strategy benchmark, provided that the replacement benchmark is selected in compliance with certain parameters, for example, as described in Active Asset Strategies below. In some embodiments, notwithstanding the ability to replace Active Asset Strategies, the Fund Engine and/or associated user may not be permitted to change the Strategic Targets or the Strategic Allocations.

In some embodiments, the Fund Engine and/or an associated Investment Manager may make changes to the investment composition of each Active Asset Strategy (including, without limitation, by reallocating all investments from an RP Separate Account to a Pooled Investment Vehicle or vice versa, by adding or removing a Pooled Investment Vehicle to an Active Asset Strategy, by replacing a benchmark and by adding or removing types of securities and instruments) consistent with the respective Active Asset Strategy's investment objective. Any such decision may be made based upon relevant factors, which may include, without limitation, regulatory considerations, applicable investment restrictions and/or limitations of one form of investment, the cost and feasibility of RP Separate Account management and diversification when investment sizes are relatively small and reliability. Further, a Pooled Investment Vehicle in which the RP Fund is invested may make changes to its investment program and composition without notice to the RP Fund. In some embodiments, the Fund Engine may not have the ability to consider the appropriateness of any such change with respect to the applicable Active Asset Strategy's investment objective and program until after such change occurred. If practicable, the Fund Engine and/or associated user may respond to such changes so as to minimize the impact on the RP Fund.

Rebalancing the Active Asset Strategies

The actual allocation among Active Asset Strategies may, from time to time, be out of balance with the Strategic Targets and outside the ranges of the Strategic Allocations due to various factors, such as varying investment performances among the Active Asset Strategies. The Fund Engine may evaluate the conformity of the RP Fund's actual allocations to the Active Asset Strategies to the Strategic Allocations on each business day based on estimates of the NAVs of and other information regarding the RP Fund's investments as of the close of business on the preceding business day. In the event that, based on such evaluations, the Fund Engine and/or associated user determines that the actual allocation to one or more of the Active Asset Strategies is outside the ranges of such Strategic Allocations, the RP Fund's assets may be rebalanced in order to more closely achieve the Strategic Targets as soon as practicable.

In addition, the Fund Engine may evaluate the conformity of the RP Fund's actual allocations to the Active Asset Strategies to the Strategic Targets as of the first business day of each calendar quarter (or other periodic date) (each a "Rebalancing Date") based on estimates of the NAVs of and other information regarding the RP Fund's investments as of the close of business on the preceding business day. In the event that, based on such evaluations, the Fund Engine (and/or associated user) determines that the actual allocations to one or more of the Active Asset Strategies is out of balance with the Strategic Targets as of a Rebalancing Date, the RP Fund's assets may be rebalanced in order to more closely achieve the Strategic Targets. Depending on the embodiment of the Fund Engine, rebalancing may occur more or less frequently.

In one embodiment of the Fund Engine, rebalancing of the RP Fund's assets to more closely achieve the Strategic Targets (or to maintain the Minimum Capital Assets Allocation) may be effected first by allocating any assets of the RP Fund then available for such allocation (after paying or reserving for fees, expenses and other liabilities of the RP Fund) and second by liquidating assets in the Active Asset Strategies in which the RP Fund is over-invested, with a view to allocating the proceeds of any such liquidation, following receipt thereof. In addition, to the extent that (i) the RP Fund receives subscription proceeds or (ii) it is necessary to liquidate assets in order to meet redemption requests by its members, the Fund Engine (and/or associated user) may allocate such subscription proceeds and effect such liquidation(s) in a manner designed to attempt to achieve the Strategic Targets (and to maintain the Minimum Capital Assets Allocation).

Active Asset Strategies

The following is a summary of some possible Active Asset Strategies for an embodiment of the Fund Engine, including a description of the instruments in which the assets of each Active Asset Strategy may be invested whether accessed through an RP Separate Account or indirectly through Pooled Investment Vehicles, as applicable. It is noted that not all of the investment instruments described with respect to an Active Asset Strategy will necessarily be utilized by such Active Asset Strategy at the same time and, over time, the Fund Engine and/or associated users, such as an Investment Manager, may add additional investment instruments in respect of an Active Asset Strategy.

As discussed above, the Fund Engine generally manage and/or facilitates management of the assets within each Active Asset Strategy to outperform the relevant performance benchmark, it is noted that there may be some periods, including substantial periods of time, during which an Active Asset Strategy is instead invested in a manner designed to replicate the applicable performance benchmark (such as through exchange-traded funds ("ETFs"), futures contracts on indices and swaps) ("Passive Investments") for various reasons including, without limitation, limitations on assets that may be allocated to an Active Asset Strategy. In such instances, such Active Asset Strategies may have a significant portion of investments that are not dedicated to outperforming the relevant performance benchmark.

In one embodiment, the Fund Engine may monitor levels of tracking error for each Active Asset Strategy. Tracking error is defined as the standard deviation of the difference between (i) the daily price changes of the Active Asset Strategy and (ii) the daily price changes of that Active Asset Strategy's benchmark. In one implementation, tracking error may be measured in this way on a rolling 120 day basis. In on embodiment, the Fund Engine monitors the tracking error of an Active Asset Strategy and if it exceeds the tracking error cap for that Active Asset Strategy (each a "Tracking Error Limit") for a specified period (e.g., 60 consecutive days), the Fund Engine and/or associated user may take action to return the Active Asset Strategy to the tracking error target for that Active Asset Strategy (each a "Tracking Error Target") including, without limitation, blending the current Active Asset Strategy with an index that is a Passive Investment and that mirrors the Active Asset Strategy benchmark, replacing an Active Asset Strategy with a new strategy, or other such remedy as determined by the Fund Engine and/or associated administrator or user.

Commodities Strategy

In one embodiment of the Fund Engine, the investment objective for the Commodities Strategy may be to outperform the returns of a widely accepted commodities benchmark (for example, that is or is similar to the Standard & Poor's Goldman Sachs Commodity Index) over a full market cycle through a portfolio of diversified commodity investments with a specified Tracking Error Target (e.g., 2%) and a specified Tracking Error Limit (e.g., 4%). Depending on the implementation, any of a number of recognized benchmarks may be used, for example, the Dow Jones-AIG Commodity Index and/or the like.

In some embodiments of the Fund Engine, to achieve its investment objective, it is expected that the Commodities Strategy will invest a substantial portion of assets in a portfolio of commodity futures, short-term interest bearing investments and other instruments that correspond generally to the components of the commodity index, but which may deviate from the index in a variety of ways as determined by the Fund Engine (and/or associated user, such as an Investment Manager), how and when the futures contracts are "rolled" (i.e., disposed of and replaced), the extent to which the portfolio is collateralized, and the investment of the collateral for the futures contracts. Any cash required to be posted as margin in connection with the Commodities Strategy may be invested in "eligible securities" as determined by the rules of the applicable exchange and the investment restrictions below, which may include, by way of non-limiting example, such investments as: U.S. Government short-term securities; corporate debt securities; municipal securities, including both negative-wealth-impactor-vulnerable and negative-wealth-impactor-exempt securities; money market instruments; repurchase agreements (including repurchase agreements with deliver-out to custodian or tri-party arrangements, in some embodiments subject to certain limitations, for example, that the agreements must (i) be fully collateralized (102%) by permitted investments, (ii) be Fund Engine approved counterparties or Federal Reserve member banks and primary dealers, (iii) be marked-to-market daily and (iv) have a maximum term of 90 days); short-term investment funds ("STIFs") of the RP Fund's custodian; derivatives used for managing of interest rate exposure, volatility, term structure, sector exposures, including, but not limited to, swaps (including interest rate swaps, credit default swaps, index swaps, and total-rate-of-return swaps), futures contracts, and options (including options on futures, securities, security indices, or credit indices) on any permitted investment (as set forth herein) (subject to certain limitations, which may include that the derivative be backed by permitted investments).

Emerging Markets Debt Strategy

In one embodiment, the investment objective for the Emerging Markets Debt Strategy may be to outperform the returns of a widely accepted emerging markets debt index (e.g., JP Morgan EMBI Global Diversified Index and/or the like) over a full market cycle through a portfolio of diversified investments in fixed-income securities of issuers located in emerging market countries with a specified Tracking Error Target (e.g., 3%) and a Tracking Error Limit (e.g., 6%). In one implementation of the Fund Engine, the Emerging Markets Debt Strategy may specify investment in all types of U.S. dollar and non-U.S. dollar emerging market country fixed-income securities, including but not limited to: Brady bonds, Eurobonds, corporate bonds, and other debt securities and money market instruments issued by governments of emerging market countries, their agencies and instrumentalities, or by their central banks; interests issued by entities organized and operated for the purpose of restructuring the investment characteristics of instruments issued by emerging market country issuers; fixed and floating rate, senior and subordinated debt obligations and money market instruments (such as bonds, debentures, notes and commercial paper) of corporations or banks domiciled in emerging market countries; loan participations of borrowers domiciled in emerging market countries; private placements of debt securities including, but not limited to, Rule 144A debt securities, of issuers domiciled in emerging market countries; structured notes whose interest or principal payments are linked to any permitted investment; new issues of any permitted investment; derivative transactions including, but not limited to, swaps (including interest rate swaps, credit default swaps, index swaps, and total-rate-of-return swaps), futures contracts, forward contracts, warrants and options (including options on futures, securities, security indices, or credit indices) on any permitted investment (subject to certain limitations, which may include that the derivative be backed by permitted investments); repurchase agreements including repurchase agreements with deliver-out to custodian or tri-party arrangements (subject to certain limitations, for example, that the agreements must (i) be fully collateralized (102%) by permitted investments, (ii) be approved counterparties or Federal Reserve member banks and primary dealers, (iii) be marked-to-market daily and (iv) have a maximum term of 90 days); and/or the like.

In some embodiments, the Emerging Markets Debt Strategy may also indicate investment in: currencies, currency futures, currency forwards (including non-deliverable forwards) and currency options for transaction settlement and currency risk management purposes; government bond futures and options on government bond futures for any governments of developed market countries for purposes of interest rate risk management; investment-grade debt securities and money market instruments issued by any of the governments or government agencies of, or corporations or banks domiciled in, developed market countries; STIFs of the RP Fund's custodian; and cash management facilities of the RP Fund's clearing futures commission merchant.

In one embodiment, cash, money market instruments, or investment-grade debt securities held in the Emerging Markets Debt Strategy for the purposes of defeasing the obligations of a derivative instrument may be issued by an emerging market country or by any of the governments or government agencies of, or corporations or banks domiciled in, an emerging market country. In one implementations, the combination of a derivative on an emerging markets country investment and such additional investments, if any, held to defease the obligations of the derivative may be counted as an emerging market country investment for the purpose of describing the asset allocation of the Emerging Markets Debt Strategy.

In some embodiments of the Fund Engine, for purposes of the Active Asset Strategies, the term "emerging market countries" may include: (a) countries that are generally considered low or middle income countries by the International Bank for Reconstruction and Development (commonly known as the World Bank) and the International Finance Corporation; (b) countries that are classified by the United Nations or otherwise regarded by their authorities as emerging; (c) any country representing a market capitalization of less than 3% (or the like) of the Morgan Stanley Capital World Index (and/or the like); and (d) any other country determined to have characteristics similar to the countries described above. The term "emerging market" may refer to any market of an emerging market country.

In on embodiment, allocations of the Emerging Markets Debt Strategy's investments may depend upon the relative attractiveness of the emerging market country markets and particular issuers. In addition, macro-economic factors and/or additional information regarding the relative attractiveness of emerging market countries may be considered in allocating investments among emerging market countries. In some implementations, investments may be structured to express views on relative value between different countries, specific bonds, or yield curves.

Emerging Markets Equity Strategy

In some embodiments of the Fund Engine, the investment objective for the Emerging Markets Equity Strategy may be to outperform the returns of a widely accepted emerging markets equity index (e.g., that is or is similar to the MSCI Emerging Markets Index or the like) over a full market cycle through a portfolio of diversified equity investments of emerging market country issuers with a specified Tracking Error Target (e.g., 6%) and a specified Tracking Error Limit (e.g., 8%). The Emerging Markets Equity Strategy may, in some embodiments, consist of equity and fixed income instruments. Equity investments (which may be denominated in any currency) may, without limitation, include: common or preferred stock of any emerging market country issuer, including small capitalization stocks and stocks of companies which (including predecessors) have operated for fewer than three years; securities taking the form of sponsored and/or unsponsored American Depository Receipts ("ADRs"), Global Depository Receipts ("GDRs") and/or European Depository Receipts ("EDRs") of any emerging market country issuer; securities of special purpose issuers of all types including, without limitation, unit investment trusts, world equity benchmark shares, ETFs, open-end and closed-end unit investment trusts containing principally securities of emerging market country issuers; private placements of public equity securities of emerging market country issuers; stock purchase rights or warrants to acquire any permitted investment (as set forth herein); forward and when-issued securities of any permitted investment; structured notes whose interest or principal payments are linked to any permitted investment (as set forth herein); new issues of any permitted investment, including initial public offerings ("IPOs") of securities, although in some embodiments participation in an IPO may be restricted if the underlying securities constitute "new issues" (e.g., as defined in NASD Rule 2790, as amended, supplemented and interpreted from time to time by the Financial Industry Regulatory Authority ("FINRA")) or for other regulatory reasons; and derivative transactions including, but not limited to, swaps (including interest rate swaps, credit default swaps, index swaps, and total-rate-of-return swaps), futures contracts, forward contracts, warrants and options (including options on futures, securities, security indices, or credit indices) on any permitted investment (subject to certain limitations, which may include that the derivative be backed by permitted investments).

In some embodiments, fixed income investments may, without limitation, include: convertible debt securities of any emerging market country issuer; fixed-income securities of any emerging market country issuer; Brady bonds, Eurobonds, corporate bonds, and other debt securities and money market instruments issued by governments of emerging market countries, their agencies and instrumentalities, or by their central banks; money market instruments (such as (i) government securities, (ii) obligations of banks including but not limited to certificates of deposit, time deposits, bank notes and bankers' acceptances and (iii) obligations issued or guaranteed by corporations (e.g., commercial paper and promissory notes)); and repurchase agreements including repurchase agreements with deliver-out to custodian or tri-party arrangements (in some implementations subject to certain limitations including that the agreements must (i) be fully collateralized (102%) by permitted investments, (ii) be approved counterparties or Federal Reserve member banks and primary dealers, (iii) be marked-to-market daily and (iv) have a maximum term of 90 days).

In one implementation, the Emerging Markets Equity Strategy may also invest in: equity and investment-grade debt securities and money market instruments issued by any of the governments or government agencies of, or corporations or banks domiciled in, developed market countries; currencies, currency futures, currency forwards (including non-deliverable forwards) and currency options for transaction settlement and currency risk management purposes; STIFs of the RP Fund's custodian; cash management facilities of the RP Fund's clearing futures commission merchant; and/or the like.

In one embodiment of the Fund Engine, cash, money market instruments, or investment-grade debt securities held in the Emerging Markets Equity Strategy for the purposes of defeasing the obligations of a derivative instrument held in that account may be issued by an emerging market country or by any of the governments or government agencies of, or corporations or banks domiciled in, the countries in the MSCI World Equity Index or JPMorgan GGB Index. The combination of the derivative on an emerging market country issuer or issuers and such additional investments, if any, held to defease the obligations of the derivative may be counted as an emerging market country investment for the purpose of describing the asset allocation of the Emerging Markets Equity Strategy.

In some embodiments, for purposes of the Active Asset Strategies, an emerging market country issuer is any company that either (i) has a class of securities whose principal securities market is an emerging market country; (ii) is organized under the laws of, or has a principal office in, an emerging market country; (iii) derives 50% of more of its total revenue from goods produced, sales made or services provided in one or more emerging market countries; or (iv) maintains 50% or more of its assets in one or more emerging market countries.

Global Equity Strategy

In one embodiment of the Fund Engine, the investment objective for the Global Equity Strategy is to outperform the returns of a widely accepted global equity index (e.g., that is or is similar to the MSCI World (unhedged) Index, the MSCI ACW (All Country World) Index, the MSCI World Value Index, the MSCI World Growth Index, and/or the like) over a full market cycle through a portfolio of diversified global equity investments with a specified Tracking Error Target (e.g., 2%) and a specified Tracking Error Limit (e.g., 4%).

In some implementations, the Global Equity Strategy will be comprised of equity and fixed income instruments. Equity investments (which may be denominated in any currency) may, by way of non-limiting example, include: common and preferred stock of any equity issuer traded on the global stock exchange, including foreign-country domiciled or in over-the-counter ("OTC") markets, and including securities of companies that have operated for fewer than three years; securities taking the form of sponsored and/or unsponsored ADRs, GDRs and/or EDRs of equity issuers; stock purchase rights and warrants of equity issuers; securities of special purpose issuers of all types including, without limitation, unit investment trusts, world equity benchmark shares, exchange traded funds, open-end and closed-end funds and real estate investment trusts containing principally equity securities; private placements of public equity securities; forward and when-issued securities of any permitted investment; structured notes whose interest or principal payments are linked to any permitted investment; equity index futures; new issues of any permitted investment, IPOs of securities of the above types (although in some implementations participation in an IPO may be restricted if the underlying securities constitute "new issues" pursuant to NASD Rule 2790 or for other regulatory reasons); and derivative transactions and holdings including, but not limited to, swaps (including interest rate swaps, credit default swaps, index swaps, and total-rate-of-return swaps), futures contracts, forward contracts, warrants and options (including options on futures, securities, security indices, or credit indices) on any permitted investment (subject to certain limitations, which may include that the derivative be backed by permitted investments).

Fixed income investments may, by way of non-limiting example, include: convertible debt securities of any large-cap equity issuer; money market instruments (including buy not limited to: (i) government securities, (ii) obligations of banks including but not limited to certificates of deposit, time deposits, bank notes and bankers' acceptances and (iii) obligations issued or guaranteed by corporations (e.g., commercial paper and promissory notes)) except money market instruments issued by emerging market country issuers; and repurchase agreements including repurchase agreements with deliver-out to custodian or tri-party arrangements (subject to certain limitations, for example, that the agreements must (i) be fully collateralized (102%) by permitted investments, (ii) be approved counterparties or Federal Reserve member banks and primary dealers, (iii) be marked-to-market daily and (iv) have a maximum term of 90 days).

Depending on the embodiment, the Global Equity Strategy may also specify investment in: currencies, currency futures, currency forwards (including non-deliverable forwards) and currency options for transaction settlement and currency risk management purposes; STIFs of the RP Fund's custodian; and cash management facilities of the RP Fund's clearing futures commission merchant. In some implementations, cash, money market instruments, or investment-grade debt securities held in the Global Equity Strategy for the purposes of defeasing the obligations of a derivative instrument held in that account may be issued by any of the governments or government agencies of, or corporations or banks domiciled in, the countries in the MSCI World Equity Index or JPMorgan GGB Index. The combination of the derivative on a large-cap equity issuer or issuers and such additional investments, if any, held to defease the obligations of the derivative may be counted as a large-cap equity investment for the purpose of describing the asset allocation of the Global Equity Strategy. In some embodiments, for purposes of the Active Asset Strategies, the term "large-cap equity" includes the securities of issuers having public stock market capitalizations at the time of the investment (based upon shares available for trading on an unrestricted basis) similar to that of the range of market capitalizations of companies constituting the MSCI World (unhedged) Index. The Global Equity Strategy does not necessarily limit investments to securities in the MSCI World (unhedged) Index. The Global Equity Strategy's investments may be selected using both a variety of quantitative techniques and fundamental research in seeking to maximize the Global Equity Strategy's expected total return, while maintaining risk, style, capitalization and industry characteristics similar to the MSCI World (unhedged) Index or the like. In some implementations, the Global Equity Strategy seeks a portfolio consisting primarily of companies with large market capitalizations, strong expected earnings growth and momentum, and better valuation and risk characteristics than those of the average company in the MSCI World (unhedged) Index or the like.

High Yield Strategy

In some embodiment of the Fund Engine, the investment objective for the High Yield Strategy is to outperform the returns of a widely accepted high yield index (that is or is similar to the Lehman Brothers High Yield Index—2% issuer constrained and/or the like) over a full market cycle through a portfolio of diversified investments in high yield fixed income securities with a specified Tracking Error Target (e.g., 3%) and a specified Tracking Error Limit (e.g., 6%). In one implementation, the High Yield Strategy may consist of U.S. dollar and non-U.S. dollar denominated non-investment grade securities and investment grade instruments. Non-investment grade securities (which may be denominated in any currency) may, without limitation, include: senior and subordinated corporate debt obligations, including but not limited to bonds, debentures, notes, and commercial paper; convertible and non-convertible corporate debt obligations; loan participations; custodial receipts; preferred stock; municipal securities; securities of special purpose issuers of all types including, without limitation, unit investment trusts, ETFs, open-end and closed-end unit investment trusts consisting principally of non-investment grade securities; structured notes whose interest or principal payments are linked to any permitted investment (as set forth herein); new issues of any permitted investment, including an IPO of securities, although participation in an IPO may, in some embodiments, be restricted if the underlying securities constitute "new issues" pursuant to NASD Rule 2790 or for other regulatory reasons; derivative transactions including, but not limited to, swaps (including interest rate swaps, credit default swaps, index swaps, and total-rate-of-return swaps), futures contracts, forward contracts, warrants and options (including options on futures, securities, security indices, or credit indices) on any permitted investment (subject to certain limitations, which may include that the derivative be backed by permitted investments); money market instruments (such as (i) government securities, (ii) obligations of foreign banks including but not limited to certificates of deposit, time deposits, bank notes and bankers' acceptances and (iii) obligations issued or guaranteed by foreign corporations payable in U.S. dollars (e.g., commercial paper and promissory notes)) except money market instruments issued by emerging market country issuers; and repurchase agreements including repurchase agreements with deliver-out to custodian or tri-party arrangements (subject to certain limitations including that the agreements must (i) be fully collateralized (e.g., 102%) by permitted investments, (ii) be approved counterparties or Federal Reserve member banks and primary dealers, (iii) be marked-to-market daily and (iv) have a maximum term of 90 days).

The High Yield Strategy may also invest in: currencies, currency futures, currency forwards (including non-deliverable forwards) and currency options for transaction settlement and currency risk management purposes; government bond futures and options on government bond futures for any governments of developed market countries for purposes of interest rate risk management; investment-grade debt securities and money market instruments issued by any of the governments or government agencies of, or corporations or banks domiciled in, developed market countries; STIFs of the RP Fund's custodian; and cash management facilities of the RP Fund's clearing futures commission merchant. In some embodiments, cash, money market instruments, or investment-grade debt securities held in the High Yield Strategy for the purposes of defeasing the obligations of a derivative instrument held in that account may be issued by any of the governments or government agencies of, or corporations or banks domiciled in, the countries in the MSCI World Equity Index or JPMorgan GGB Index. The combination of the derivative on a non-investment grade security or securities and such additional investments, if any, held to defease the obligations of the derivative may be counted as a non-investment grade security for the purpose of describing the asset allocation of the High Yield Strategy.

In one embodiment of the Fund Engine, for purposes of the Active Asset Strategies, the term "non-investment grade securities" may include securities of issuers whose long-term obligations are rated BB, Ba or below by a nationally recognized statistical rating organization ("NRSRO") or, if unrated, determined by the Fund Engine and/or an associated user such as an Investment Manager to be of comparable quality, or securities of issuers whose money market instruments are rated A2, P2, or below by any NRSRO or, if unrated, determined to be of comparable quality. The term "investment grade" may include debt securities rated BBB, Baa or above by any NRSRO and money market instruments rated A1 or P1 by any NRSRO.

US Small Cap Equity Strategy

In some embodiments of the Fund Engine, the investment objective for the US Small Cap Equity Strategy is to outperform the returns of a widely accepted small cap index (that is or is similar to the Russell 2000 Index, Russell 2000 Growth Index, Russell 2000 Value Index, Russell 2500 Index, Russell 2500 Growth Index, Russell 2500 Value Index, and/or the like) over a full market cycle through a portfolio of diversified investments in small-cap equity investments with a specified Tracking Error Target (e.g., 3%) and a specified Tracking Error Limit (e.g., 5%).

In some implementations, the US Small Cap Equity Strategy may consist of small-cap equity and fixed income instruments. Equity investments may, by way of non-limiting example, include: common stock of any small-cap equity issuer traded on the global stock exchange, including foreign-country domiciled or in OTC markets, and including securities of companies that have operated for fewer than three years; stock purchase rights and warrants of small-cap equity issuers; securities of special purpose issuers of all types including, without limitation, unit investment trusts, world equity benchmark shares, open-end and closed-end funds and real estate investment trusts containing principally small-cap equity securities; private placements of public small-cap equity securities; forward and when-issued securities of any permitted investment; structured notes whose interest or principal payments are linked to any permitted investment; new issues of any permitted investment, including IPOs of securities of the above types, although, in some implementations, participation in an IPO may be restricted if the underlying securities constitute "new issues" pursuant to NASD Rule 2790 or for other regulatory reasons; and derivative transactions including, but not limited to, swaps (including interest rate swaps, credit default swaps, index swaps, and total-rate-of-return swaps), futures contracts, forward contracts, warrants and options (including options on futures, securities, security indices, or credit indices) on any permitted investment (subject to certain limitations, which may include that the derivative be backed by permitted investments).

It should be noted that for purposes of the Active Asset Strategies, the term "small-cap equity" may include the securities of issuers having public stock market capitalizations at the time of the investment (based upon shares available for trading on an unrestricted basis) similar to that of the range of market capitalizations of companies constituting the Russell 2000 Index or the like. Depending on the embodiment of the Fund Engine, the US Small Cap Equity Strategy may not be required to limit investments to securities in the Russell 2000 Index or the like. For example, in such an embodiment, if the market capitalization of a company whose securities are held in the US Small Cap Equity Strategy moves outside this range, the US Small Cap Equity Strategy may, but is not required to, indicate and/or initiate selling the securities.

Capital Assets

In some embodiments of the Fund Engine, the Capital Assets of the RP Fund may only be invested in Registered Investment Funds that exclusively invest in money market instruments and meet specified criteria, for example, in one embodiment, the following criteria ("RP Qualified Money Market Funds"): the fund adheres to Rule 2a-7 of the Investment Company Act ("Rule 2a-7"); the fund is rated at least Aaa by Moody's or AAA by S&P; the fund is affiliated with a financial family or complex that is rated investment grade by both Moody's or S&P; the fund offers daily liquidity in the ordinary course of business; the fund maintains an average portfolio maturity not exceeding 60 days; the fund's assets are rated at least A1 by S&P and P1 by Moody's; the fund's assets include only U.S. government securities, U.S. dollar denominated commercial paper and repurchase agreements.

In one embodiment, in the event that the Minimum Capital Assets Allocation exceeds a specified amount, for example, 10% of the total RP Fund NAV, the RP Fund will may indicate the use of interest rate swaps ("Eligible Swaps") such that the aggregate notional amount (the "Notional Amount") of such Eligible Swaps is at all times at least 90% (or the like) of the Minimum Capital Assets Allocation. Eligible Swaps may be fully collateralized interest rate swaps created under swap agreements (e.g., using the International Swaps and Derivatives Association, Inc. Master Agreement and Credit Support Annex documentation) between the RP Fund and swap counterparties selected by the Fund Engine and/or associated user, including an Investment Manager. Under Eligible Swaps, the RP Fund may be entitled to receive periodic payments, for example, monthly fixed interest payments equal to one-twelfth of the Base Rate on the Notional Amount, and may be obligated to pay periodic floating rate interest, for example, monthly floating rate interest equal to the London Interbank Offered Rate for one-month U.S. dollar deposits ("one-month LIBOR") on the Notional Amount. In one implementation, Eligible Swaps may terminate five business days prior to the RP Final Scheduled Distribution Date, and may be subject to additional criteria. The Minimum Capital Assets Allocation and the minimum required allocation to Eligible Swaps may, in some embodiments, be fixed and not subject to adjustment. Accordingly, the Fund Engine (and/or associated users) may be unable to underweight the allocation to Capital Assets or Eligible Swaps and may be required to rebalance the RP Fund's allocations to Capital Assets from time to time. In some embodiments, the RP Fund may pay a management fee.

Distributions

In some embodiments of the Fund Engine, the RP Fund is obligated to periodically pay distributions with respect to each unit of member ship interest ("RP Units"). For example, in one embodiment, on the 23rd day of each month until the RP Final Scheduled Distribution Date (or if such day is not a business day, the next business day) (each, an "RP Fund Payment Date"), the RP Fund is obligated to pay distributions in an amount equal to one-twelfth of a base rate (the "Base Rate") multiplied by the Protected Unit Value (the "Base Fund Distribution"). The Base Rate may be an initial specified rate (e.g., 1.60%), but may be increased/decreased as necessary. In addition, the RP Fund may be obligated to pay with respect to each RP Unit, on each RP Fund Payment Date, a variable distribution (the "Variable Fund Distribution") equal to one-twelfth of the excess, if any, of (a) 1.75% (or other specified amount) multiplied by the RP Unit Value (as determined on the immediately preceding RP Calculation Date) minus (b) 1.00% (or other specified amount) multiplied by the Protected Unit Value. In some embodiments, the RP Fund may not make any Variable Fund Distribution if it owes any Base Fund Distribution or interest thereon.

Notes issued to the Fund may, in some instances, have different terms to address costs, expenses or compensation attributable to the Issuers or their affiliates for their respective note programs. The Fund Engine (and/or associated users) may, from time to time, increase/decrease the Base Rate as a result of negotiations. Issuers that directly or indirectly invest in the RP Fund and have negotiated such terms may receive the increased/decreased amount. In some implementations, for notes purchased prior to the date of any Base Rate increase, the Fund may be entitled to receive higher Contingent Coupon payments corresponding to any such increase.

In some implementations, if the RP Fund does not pay the full Base Fund Distribution on the scheduled date, the RP Fund may be required to pay the unpaid distribution amount plus interest as soon as practicable. Interest may, in some embodiments, compound daily at overnight LIBOR plus 100 basis points. In one embodiment, the RP Fund may redeem outstanding RP Units and pay distributions thereon on the RP Final Scheduled Distribution Date or following any earlier complete liquidation of its assets. In order to effect the redemption of all RP Units on the RP Final Scheduled Distribution Date, the Fund Engine may liquidate the assets of the RP Fund prior to the RP Final Scheduled Distribution Date such that the RP Fund holds only cash on the RP Final Scheduled Distribution Date. As a result, the assets of the RP Fund may not be fully invested pursuant to the RP Fund's investment program for some period of time prior to the RP Final Scheduled Distribution Date.

Additional Eligible Fund Investments

In some embodiments, from time to time, the Fund Engine may be unable to invest substantially all the Fund's assets in notes for a number of reasons, such as, by way of non-limiting example, due to the lack of availability of Issuers from whom to purchase notes or if the Fund redeems notes to comply with indicated diversification requirements. In any such circumstance, the Fund Engine (an/or associated users) may invest in certain additional assets (each, an "Eligible Fund Investment"), directly or indirectly through Registered Investment Funds that adhere to necessary regulations and parameters, for example, provided that the Registered Investment Fund (i) has a credit rating of at least AAA by S&P or Aaa by Moody's, or a comparable rating from any other nationally recognized securities rating organization ("NRSRO") and (ii) invests solely in Eligible Fund Investments.

Eligible Fund Investments may be, in some implementations, subject to investment criteria, for example, the those set forth below and as such may only include: (i) debt obligations of the United States; (ii) debt obligations issued, insured or guaranteed by a department or agency of the United States Government, if the debt obligation, insurance or guarantee commits the full faith and credit of the United States for the repayment of the debt obligation; (iii) general debt obligations of a state or political subdivision thereof; (iv) debt obligations of the Federal National Mortgage Association ("FNMA"), the Government National Mortgage Association ("GNMA"), the Federal Home Loan Mortgage Corporation ("FHLMC"), the Student Loan Marketing Association, a Federal Home Loan Bank ("FHLB"), the Federal Farm Credit Bank ("FFCB"), and the TVA; and (v) debt obligations which are backed by Canada, any Province of Canada, or any political subdivision of any such Province to a degree which is comparable to the liability of the United States, any State, or any political subdivision thereof for any obligation which is backed by the full faith and credit of the United States, such State, or such political subdivision; debt obligations (including, without limitation, corporate debt obligations and non-U.S. sovereign and sovereign-guaranteed debt obligations), which may be denominated in U.S. dollars or other currencies, that are rated in one of the four highest rating categories by two or more NRSROs, or by one NRSRO if the security has been rated by only one NRSRO, and which (i) are registered under the Securities Act, (ii) are offered and sold under Rule 144A under the Act, or (iii) in the Investment Manager's sole judgment, can be sold with reasonable promptness at a price that corresponds reasonably to their fair value; repurchase agreements, including repurchase agreements with deliver-out to custodian or tri-party arrangements (subject to certain limitations including that the agreements must (i) be fully collateralized (102%) by Eligible Fund Investments, (ii) be with counterparties that are rated (or the guarantor of such counterparty's with respect to the counterparty's obligations under the transaction that is rated) in one of the four highest rating categories by two or more NRSROs, or by one NRSRO if the counterparty (or guarantor, if applicable) has been rated by only one NRSRO, (iii) be marked-to-market daily and (iv) have a maximum term of 90 days); cash and deposits in FDIC-insured banks that are authorized to have access to Federal Reserve Bank advances and are adequately capitalized under applicable risk-based capital regulations.

In some implementations, if an Eligible Fund Investment ceases to conform with indicated requirements (such as those described above), the Fund Engine may use commercially reasonable efforts to liquidate such position on or prior to the month-end of the month following the time such Eligible Fund Investment ceases to so conform.

In some embodiments of the Fund Engine, the Fund will not invest more than a specified amount (e.g., 5%) of its net assets (for example, as determined based on U.S. GAAP) in the securities of any single issuer of any security (other than governmental or quasi-governmental agencies or issuers affiliated with or owned or sponsored by sovereign nations or governments (such as FFCB, FHLB, FNMA, FHLMC, GNMA and TVA) or cash equivalents or other short-term investments) at the time of investment in such issuer; provided, that, if at any time the Fund exceeds such specified limit (e.g., 5%) with respect to such a single issuer, the Fund Engine may use commercially reasonable efforts to liquidate a portion of such position on or prior to the end of the month following the month in which such limit is exceeded such that the Fund's investment in such issuer is then the specified amount (e.g., 5%) or less of its net assets.

Diversification Requirements

As noted above, the Fund Engine may include and/or be responsive to diversification requirements. When implementing the Fund's investment program, the Fund Engine and/or associated users may be configured or tasked to adhere to such guidelines (the "Diversity Guidelines"). The following provides, by way of non-limiting example, five sample diversification requirements for one embodiment of the Fund Engine: 1. The aggregate assets provided by any single issuer of any security (including the notes) or investment instrument (each a "Security Issuer") will not comprise more than 50% of the Fund's net assets as of the end of any calendar quarter. 2. The aggregate assets provided by any two Security Issuers will not comprise more than 65% of the Fund's net assets as of the end of any calendar quarter. 3. The aggregate assets provided by any three Security Issuers will not comprise more than 75% of the Fund's net assets as of the end of any calendar quarter. 4. The aggregate assets provided by any four Security Issuers will not comprise more than 85% of the Fund's net assets as of the end of any calendar quarter. 5. The Fund's aggregate assets shall be issued from at least five Security Issuers.

The Fund Engine may take certain measures to seek to comply with the applicable Diversity Guidelines. Such measures may include, among other things, the redemption of notes from Issuers and/or purchasing notes from additional Issuers as well as increasing or decreasing the proportion of the Fund's assets invested in the Money Market Account.

In one embodiment of the Fund Engine, in the event that investments issued or guaranteed by the U.S. Treasury become a significant portion of the Fund's assets, the Fund may adopt alternative Diversity Guidelines that exclude such investments from the above calculations consistent with the diversification requirements imposed by Section 817(h) of the Code and the Treasury Regulations thereunder and/or the like. The Fund Engine may be configured such the Fund will comply with the diversification requirements of one or more U.S. state insurance commissions or agencies that are applicable to a member, provided that such requirements would not result in the Fund's failure to comply with other necessary diversification requirements and regulations.

Cash Management

As discussed above, the Fund Engine may allocate some portion (e.g., 5%) of the Fund's NAV to cash, cash equivalents and short-term investments, pending allocation of such capital to purchase notes, in order to meet operational needs, to maintain liquidity, to fund anticipated redemptions or expenses of the Fund, or otherwise. These investments may include Eligible Fund Investments as described above in Additional Eligible Fund Investments. To the extent permitted by applicable law, the Fund may be invested in money market or similar funds.

Leverage

In some embodiments, the Fund Engine's primary investment strategy for the Fund may be to allocate substantially portions of the Fund's assets to the purchase of notes. However, the Fund may enter into a credit facility to allow the Fund to borrow when deemed appropriate by the Fund Engine (and/or associated users, such as an Investment Manager), including without limitation, to meet operational needs, to pay expenses of the Fund, to make distributions in respect of redemptions of Units or to comply with the diversification requirements, and/or the like. As such, the Fund's (and the Fund Engine's) investment program may be constrained by the terms of any such credit facility, and accordingly the Fund's investment program may not be as flexible. A certain credit facility may require the Fund to maintain certain collateral ratios and satisfy certain diversification tests, and the Fund Engine may be configured to respond to such information.

Capital Accounts; Valuation

In some embodiments of the Fund Engine, the Fund may maintain a separate capital account record for each class of Units and/or for each member with respect to each class of Units held by such member. As such, each capital account with respect to a class of Units may be (i) increased by the amount of any contributions in respect of such class, (ii) decreased for any payments in redemption of, or any distributions in respect of, such class (including any Fund Redemption Adjustment and any Structuring Redemption Fee that is specially allocated to the redeeming member), (iii) increased or decreased by such class's allocable share of the appreciation or depreciation of the net assets of the Fund (as determined below) for each Accounting Period (as defined below), and (iv) decreased by any Management Fee in respect of such class. For each Accounting Period, the appreciation or depreciation of the net assets of the Fund (before reduction for any Management Fee or any Structuring Redemption Fee that is specially allocated to a redeeming member) will be allocated to each class of Units pro rata based upon the relative capital accounts of each class of the beginning of such Accounting Period after adjustment for any capital contributions, distributions and redemptions as of the beginning of such Accounting Period. Each member's capital account with respect to each class of Units may equal the capital account of such class of Units multiplied by the percentage of Units in such class owned by such member. Capital accounts may be appropriately adjusted as determined by the Fund Engine and/or any associated user, such as a Manager.

In one embodiment, the NAV of a class of Units may be equal to the capital account balance with respect to such class of Units, and the NAV per Unit of a class may be equal to the NAV of such class divided by the number of outstanding Units of such class and the NAV of the Fund may be equal to the aggregate of the NAV of each class of Units. As used herein, "Accounting Period" may refer to the following periods. The initial Accounting Period may begin upon the commencement of operations of the Fund. Each subsequent Accounting Period begins immediately after the close of the preceding Accounting Period.

In one implementation, each Accounting Period may close at the close of business on the first to occur of (i) the last day of each calendar month, (ii) the last day of each fiscal year of the Fund, (iii) the date immediately prior to the effective date of the admission of a new member, (iv) the date immediately prior to the effective date of an additional capital contribution by a member, (v) the effective date of any redemption or complete withdrawal by a member, (vi) the date when the Fund dissolves, or (vii) such other dates as determined by the Fund Engine and/or associated user.

In some embodiments, the Fund Engine (and/or an associated user, such as an Administrator) may be responsible for calculating the NAV of the Fund and each class of Units. In some embodiments, the Fund Engine (and/or an associated user, such as an Administrator) may also be responsible for calculating the NAV of the RP Fund.

In one embodiment, the net assets of the Fund may equal its total assets less its total liabilities, each determined as set forth below. To the extent the assets of the Fund, or any portion thereof, are valued by the Fund for purposes such as calculating the NAV of the Fund, each class of Units and the Management Fee, or in connection with the redemption of Units, such valuation may be in accordance with the following: (i) the assets of the Fund that are invested in the notes will be valued as reported to the Fund by or on behalf of the Issuers (as described below) and (ii) all other assets of the Fund will be valued in accordance with procedures developed by the Investment Manager, at fair value in a commercially reasonable manner, and in accordance with U.S. generally accepted accounting principles ("U.S. GAAP") or as otherwise determined pursuant to such procedures. Such procedures may provide that valuations will be determined by the Fund Engine, an associated user such as an Investment Manager, an affiliated or independent pricing agent or others (subject to applicable law), and may be based upon information provided by, or pricing models developed by, any such party. In some implementations, the NAV of the Fund as of a particular date may be materially greater than or less than the NAV of the Fund that would be determined if the Fund's assets were to be liquidated as of such date. In some embodiments of the Fund Engine, the Fund may invest in assets that lack a readily ascertainable market value, and the Fund's NAV may be affected by the valuations of any such assets.

In some embodiments of the Fund Engine, liabilities of the Fund (including, by way of non-limiting example, indebtedness for money borrowed) may be taken into consideration in determining the NAV of the Fund and each class of Units for purposes such as calculating the Management Fee and in connection with the redemption of Units.

In some embodiments, the determination of the RP Unit Value is calculated in a manner similar to the calculation of the NAV per Unit of the Fund as discussed above. In one implementation, unlike the Fund, the RP Fund may make monthly distributions that reduce its NAV. The NAV of the RP Fund as of a particular date may be materially greater than or less than the NAV of the RP Fund that would be determined if the RP Fund's assets were to be liquidated as of such date. Additionally, the RP Unit Value may be based upon estimates and subject to later adjustment based on valuation information available to the RP Fund at that time, including for example as a result of year-end audits. In some implementations, adjustment to the RP Unit Value may result in an adjustment to the note valuations and consequently, to the NAV of the Fund.

Redemption of Units

As discussed above, in one embodiment of the Fund Engine, each member has the right to redeem some or all of its Units periodically, for example, as of the close of business on the last business day of each calendar month (each, a "Redemption Date"), in one such embodiment, by providing prior written notice by the $13^{th}$ day of such month. In one implementations, other than redemptions in connection with Contract Expenses and Death Benefits, each redemption may be subject to a minimum redemption amount (e.g., $1,000,000), unless such requirement is waived or the member is redeeming all of its Units. A redemption that would cause the NAV of a member's remaining Units to be less than a specified amount (e.g., $1,000,000), regardless of class, immediately following such redemption may be treated by the Fund Engine as a request for redemption of all of the member's remaining Units in the Fund, unless the such requirement are waived to permit the requested partial redemption. Different implementations of the Fund Engine may allow for the specifications of other redemption times. Other implementations may also restrict or further limit redemptions and/or suspend determination of the Fund NAV. In some implementations, the Fund Engine may require any member, as of any date, to redeem some or all of its Units at any time and for any reason (including, without limitation, if any member or Contract holder may have violated any of its representations, warranties or covenants made in connection with an acquisition by a member of Units, for regulatory or negative-wealth-impactor reasons, because a redemption would be in the best interest of the Fund, the other members, the Manager or any affiliate of the Manager, as determined by the Fund Engine and/or associated users, and/or the like) or no reason.

Fund Engine Controller

Figure 7:
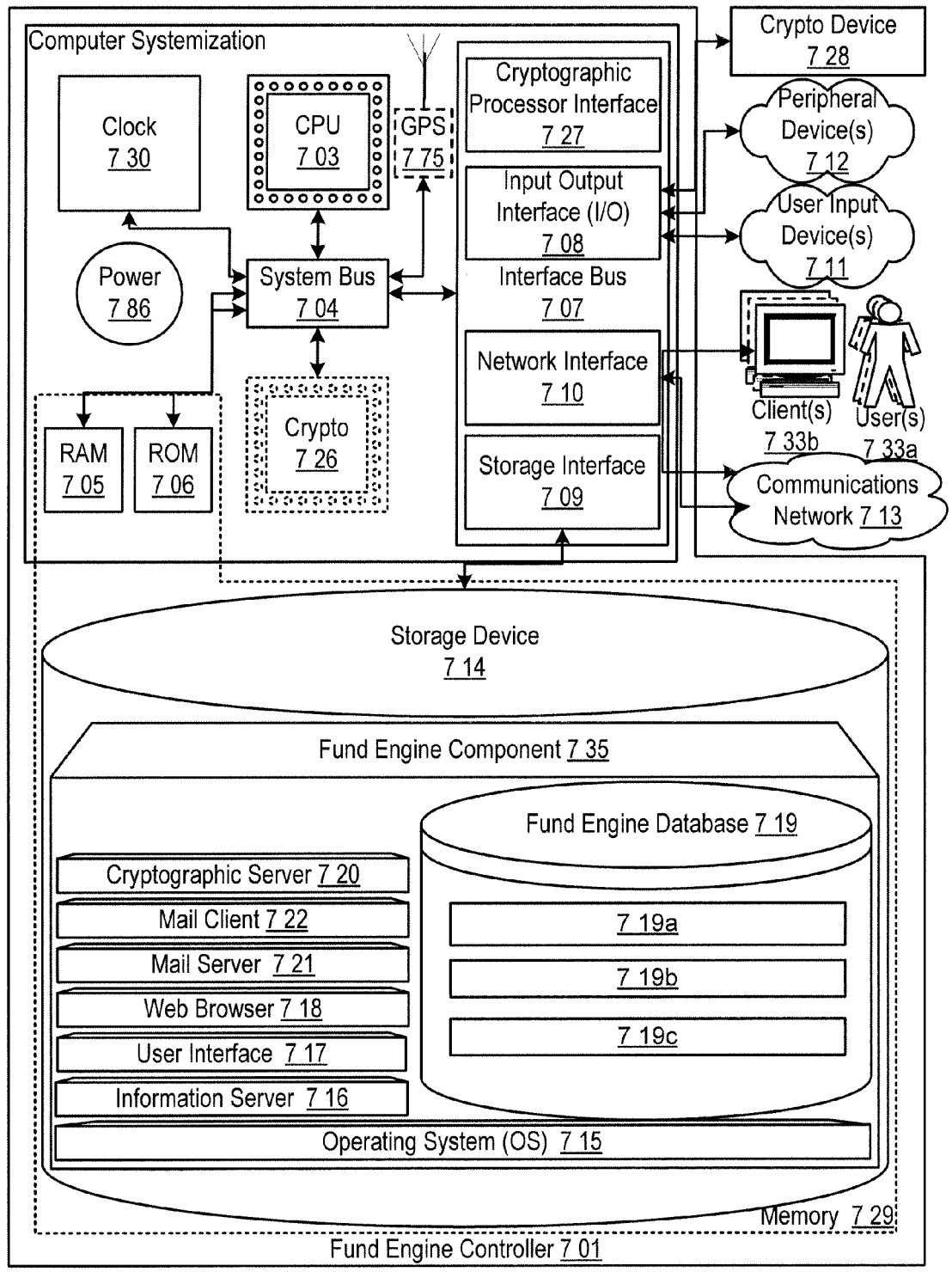
FIG. 7 is of a block diagram illustrating embodiments of the present invention of an Fund Engine controller.

FIG. 7 of the present disclosure illustrates inventive aspects of a Fund Engine controller 701 in a block diagram. In this embodiment, the Fund Engine controller 701 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors may be referred to as central processing units (CPU). One form of processor is referred to as a microprocessor. CPUs use communicative signals acting as instructions to enable various operations. Such communicative signals may be stored and/or transmitted in batches (e.g., batches of instructions) as program and/or data components facilitate desired operations. These stored instruction code signals may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Fund Engine controller 701 may be connected to and/or communicate with entities such as, but not limited to: one or more users from user input devices 711; peripheral devices 712; a cryptographic processor device 728; and/or a communications network 713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Fund Engine controller 701 may be based on common computer systems that may comprise, but are not limited to, components such as: a computer systemization 702 connected to memory 729.

Computer Systemization

A computer systemization 702 may comprise a clock 730, central processing unit (CPU and/or Processor) 703, a read only memory (ROM) 706, a random access memory (RAM) 705, and/or an interface bus 707, and most frequently, although not necessarily, the foregoing are all interconnected and/or communicating through a system bus 704 on one or more circuit (mother)board(s) 702. Optionally, the computer systemization may be connected to an internal power source 786. Optionally, a cryptographic processor 726 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through signal passing through conductive conduits (e.g., (printed) electronic and/or optic circuits) to execute stored signal instructions (i.e., program code) according to conventional data processing techniques. Such signal passing facilitates communication within the Fund Engine controller and beyond through various interfaces. Should processing requirements dictate a greater amount speed and/or capacity, distributed processors (e.g., Distributed Fund Engine), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Fund Engine may be achieved by implementing a microcontroller such as CAST's R8051XC2 microcontroller; Intel's MCS 51 (i.e., 8051 microcontroller); and/or the like. Also, to implement certain features of the Fund Engine, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Fund Engine component collection (distributed or otherwise) and/or features may be implemented via the microprocessor and/or via embedded components; e.g., via ASIC, coprocessor, DSP, FPGA, and/or the like. Alternately, some implementations of the Fund Engine may be implemented with embedded components that are configured and used to achieve a variety of features or signal processing.

Depending on the particular implementation, the embedded components may include software solutions, hardware solutions, and/or some combination of both hardware/software solutions. For example, Fund Engine features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Fund Engine features. A hierarchy of programmable interconnects allow logic blocks to be interconnected as needed by the Fund Engine system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the Fund Engine may be developed on regular FPGAs and then migrated into a fixed version that more resembles ASIC implementations. Alternate or coordinating implementations may migrate Fund Engine controller features to a final ASIC instead of or in addition to FPGAs. Depending on the implementation all of the aforementioned embedded components and microprocessors may be considered the "CPU" and/or "processor" for the Fund Engine.

Power Source

The power source 786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the Fund Engine thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(es) 707 may accept, connect, and/or communicate to a number of interface adapters, conventionally although not necessarily in the form of adapter cards, such as, but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 709 may accept, communicate, and/or connect to a number of storage devices such as, but not limited to: storage devices 714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, the Fund Engine controller is accessible through remote clients 733b (e.g., computers with web browsers) by users 733a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input Output interfaces (I/O) 708 may accept, communicate, and/or connect to user input devices 711, peripheral devices 712, cryptographic processor devices 728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless; 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 711 may be card readers, dongles, finger print readers, gloves, graphics tablets, joysticks, keyboards, mouse (mice), remote controls, retina readers, trackballs, trackpads, and/or the like.

Peripheral devices 712 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Fund Engine controller may be embodied as an embedded, dedicated, and/or monitor-less (i.e., headless) device, wherein access would be provided over a network interface connection.

Cryptographic units such as, but not limited to, microcontrollers, processors 726, interfaces 727, and/or devices 728 may be attached, and/or communicate with the Fund Engine controller. A MC68HC16 microcontroller, commonly manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 729. However, memory is a fungible technology and resource; thus, any number of memory embodiments may be employed in lieu of or in concert with one another. It is to be understood that the Fund Engine controller and/or a computer systemization may employ various forms of memory 729. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 729 will include ROM 706, RAM 705, and a storage device 714. A storage device 714 may be any conventional computer system storage. Storage devices may include a drum; a (fixed and/or removable) magnetic disk drive; a magneto-optical drive; an optical drive (i.e., Blu-ray, CD ROM/RAM/Recordable (R)/ReWritable (RW), DVD R/RW, HD DVD R/RW, etc.); an array of devices (e.g., Redundant Array of Independent Disks (RAID)); solid state memory devices (USB memory, solid state drives (SSD), etc.); and/or other devices of the like. Thus, a computer systemization generally requires and makes use of memory.

Component Collection

The memory 729 may contain a collection of program and/or database components and/or data such as, but not limited to: operating system component(s) 715 (operating system); information server component(s) 716 (information server); user interface component(s) 717 (user interface); Web browser component(s) 718 (Web browser); database(s) 719; mail server component(s) 721; mail client component(s) 722; cryptographic server component(s) 720 (cryptographic server); the Fund Engine component(s) 735; and/or the like (i.e., collectively a component collection). These components may be stored and accessed from the storage devices and/or from storage devices accessible through an interface bus. Although non-conventional program components such as those in the component collection, typically, are stored in a local storage device 714, they may also be loaded and/or stored in memory such as: peripheral devices, RAM, remote storage facilities through a communications network, ROM, various forms of memory, and/or the like.

Operating System

The operating system component 715 is an executable program component facilitating the operation of the Fund Engine controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NTNista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Fund Engine controller to communicate with other entities through a communications network 713. Various communication protocols may be used by the Fund Engine controller as a subcarrier transport mechanism for interaction, such as, but not limited to: multicast, TCP/IP, UDP, unicast, and/or the like.

Information Server

An information server component 716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or . NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Fund Engine controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Fund Engine database 719, operating systems, other program components, user interfaces, Web browsers, and/or the like.

Access to the Fund Engine database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Fund Engine. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Fund Engine as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XPNista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used) and provide a baseline and means of accessing and displaying information graphically to users.

A user interface component 717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Fund Engine enabled nodes. The combined application may be nugatory on systems employing standard Web browsers.

Mail Server

A mail server component 721 is a stored program component that is executed by a CPU 703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Fund Engine.

Access to the Fund Engine mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 722 is a stored program component that is executed by a CPU 703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Crypto graphic Server

A cryptographic server component 720 is a stored program component that is executed by a CPU 703, cryptographic processor 726, cryptographic processor interface 727, cryptographic processor device 728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Fund Engine may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Fund Engine component to engage in secure transactions if so desired. The cryptographic component facilitates the secure accessing of resources on the Fund Engine and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Fund Engine Database

The Fund Engine database component 719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Fund Engine database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Fund Engine database is implemented as a data-structure, the use of the Fund Engine database 719 may be integrated into another component such as the Fund Engine component 735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 719 includes several tables 719*a-c*. An accounts table 719*a* includes fields such as, but not limited to: account_id, user_data, account_data, position_data, product_data, market_data, tracking_data, financial_data, reporting_data, historical_data, member_data, fund_data, and/or the like. The accounts table may support and/or track multiple entity accounts on a Fund Engine. A parameters table 719*b* includes fields such as, but not limited to: parameter_id, rule_data, account_date, parameter_datatype, specification_data, action_data, buy_data, sell_data, liquidate_data and/or the like. A system table 719*c* includes fields such as, but not limited to: system_id, strategy_data, investment_data, activity_info, limitation_data, test_data, analysis_data, interface_data, action_data, liquidity_data, restriction_data, system_data, decision_data, and/or the like.

In one embodiment, the Fund Engine database may interact with other database systems. For example, employing a distributed database system, queries and data access by search Fund Engine component may treat the combination of the Fund Engine database, an integrated data security layer database as a single database entity.

In one embodiment, user programs may contain various user interface primitives, which may serve to update the Fund Engine. Also, various accounts may require custom database tables depending upon the environments and the types of clients the Fund Engine may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 719*a-c*. The Fund Engine may be configured to keep track of various settings, inputs, and parameters via database controllers.

The Fund Engine database may communicate to and/or with other components in a component collection, including itself, and/or facilities of the like. Most frequently, the Fund Engine database communicates with the Fund Engine component, other program components, and/or the like. The database may contain, retain, and provide information regarding other nodes and data.

The Fund Engine Component

The Fund Engine component 735 is a stored program component that is executed by a CPU. In one embodiment, the Fund Engine component incorporates any and/or all combinations of the aspects of the Fund Engine that was discussed in the previous figures. As such, the Fund Engine affects accessing, obtaining and the provision of information, services, transactions, and/or the like across various communications networks.

The Fund Engine component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Fund Engine server employs a cryptographic server to encrypt and decrypt communications. The Fund Engine component may communicate to and/or with other components in a component collection, including itself, and/or facilities of the like. Most frequently, the Fund Engine component communicates with the Fund Engine database, operating systems, other program components, and/or the like. The Fund Engine may contain, communicate, generate, obtain, and/or provide program component, system, user, and/or data communications, requests, and/or responses.

Distributed Fund Engines

The structure and/or operation of any of the Fund Engine node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Fund Engine controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method for managing an investment program, comprising:
   determining, using a processor, a first allocation of financial resources for a first investment fund, wherein the first allocation of financial resources identifies a first set of financial resources comprising liquid assets and a collection of structured notes;
   providing shares of the first investment fund for investment;
   determining, using the processor, a second allocation of financial resources for a second investment fund based on a constant proportion portfolio protection methodology, wherein the second allocation of financial resources allocates a second set of financial resources between active assets and capital assets; and
   providing shares of the second investment fund in support of payout obligations for structured notes.

2. The method of claim 1, further comprising:
   determining additional allocations of financial resources for additional investment funds based on constant proportion portfolio protection methodologies, wherein each additional allocation of financial resources divides an additional set of financial resources between active assets and capital assets; and
   providing shares of each additional investment fund in support of payout obligations for remaining subsets of structured notes comprising the collection of structured notes.

3. The method of claim 1, further comprising:
   monitoring at least one performance metric for the active assets;
   periodically analyzing the at least one performance metric to generate a performance metric analysis; and
   periodically rebalancing the second allocation of financial resources for the second investment fund based on a constant proportion portfolio protection methodology and the performance metric analysis.

4. The method of claim 1, wherein the liquid assets comprise cash.

5. The method of claim 1, wherein the liquid assets comprise money market instruments.

6. The method of claim 1, further comprising:
   determining a third allocation of financial resources for the active assets, wherein the third allocation of financial resources allocates a third set of financial resources among one or more strategy sector investments selected from the group consisting of: global equity, U.S. small cap equity, emerging markets equity, emerging markets debt, high yield debt and commodities.

7. The method of claim 1, wherein the active assets comprise investment interests in one or more hedge funds.

8. The method of claim 1, wherein the capital assets comprise money market funds.

9. The method of claim 1, wherein the capital assets comprise interest rate swaps.

10. The method of claim 1, wherein the collection of structured notes comprises five structured notes.

11. The method of claim 1, wherein the collection of structured notes comprises two structured notes.

12. The method of claim 1, wherein the first allocation of financial resources comprises an allocation to liquid assets of approximately 5% and an allocation to the collection of structured notes of approximately 95%.

13. The method of claim 1, wherein the second set of financial resources comprise a subset of the first set of financial resources.

14. The method of claim 1, wherein the first investment fund supports payment obligations associated with an insurance policy.

15. The method of claim 14, wherein the insurance policy comprises a bank-owned life insurance policy.

16. The method of claim 14, wherein the first set of financial resources comprise a subset of collected premium payments for the insurance policy by at least one insurance policy holder.

17. An apparatus for managing an investment program, comprising:
a memory;
an at least one processor disposed in communication with said memory and configured to issue a plurality of program instructions stored in the memory, wherein the processor issues instructions to:
determine a first allocation of financial resources for a first investment fund, wherein the first allocation of financial resources divides a first set of financial resources between liquid assets and a collection of structured notes;
provide shares of the first investment fund for investment;
determine a second allocation of financial resources for a second investment fund based on a constant proportion portfolio protection methodology, wherein the second allocation of financial resources divides a second set of financial resources between active assets and capital assets; and
provide shares of the second investment fund in support of payout obligations for structured notes.

18. The apparatus of claim 17, wherein the processor further issues instructions to:
determine additional allocations of financial resources for additional investment funds based on constant proportion portfolio protection methodologies, wherein each additional allocation of financial resources divides an additional set of financial resources between active assets and capital assets; and
provide shares of each additional investment fund in support of payout obligations for remaining subsets of structured notes comprising the collection of structured notes.

19. The apparatus of claim 17, wherein the processor further issues instructions to determine a third allocation of financial resources for the active assets, wherein the third allocation of financial resources allocates a third set of financial resources among one or more strategy sector investments selected from the group consisting of: global equity, U.S. small cap equity, emerging markets equity, emerging markets debt, high yield debt and commodities.

20. The apparatus of claim 17, wherein the processor further issues instructions to:
monitor at least one performance metric for the active assets;
analyze the at least one performance metric to generate a performance metric analysis; and
rebalance the second allocation of financial resources for the second investment fund based on a constant proportion portfolio protection methodology and the performance metric analysis.

21. The apparatus of claim 17, wherein the active assets comprise investment interests in one or more hedge funds and the capital assets comprise money market funds or interest rate swaps.

22. A system for managing an investment program, comprising:
means to determine a first allocation of financial resources for a first investment fund, wherein the first allocation of financial resources divides a first set of financial resources between liquid assets and a collection of structured notes;
means to provide shares of the first investment fund for investment;
means to determine a second allocation of financial resources for a second investment fund based on a constant proportion portfolio protection methodology, wherein the second allocation of financial resources divides a second set of financial resources between active assets and capital assets; and
means to provide shares of the second investment fund in support of payout obligations for structured notes comprising the collection of structured notes.

23. The system of claim 22, further comprising:
means to determine additional allocations of financial resources for additional investment funds based on constant proportion portfolio protection methodologies, wherein each additional allocation of financial resources divides an additional set of financial resources between active assets and capital assets; and
means to provide shares of each additional investment fund in support of payout obligations for remaining subsets of structured notes comprising the collection of structured notes.

24. The system of claim 22, further comprising:
means to monitor at least one performance metric for the active assets;
means to analyze the at least one performance metric to generate a performance metric analysis; and
means to rebalance the second allocation of financial resources for the second investment fund based on a constant proportion portfolio protection methodology and the performance metric analysis.

25. A non-transitory processor-accessible medium storing a plurality of processing instructions for managing an investment program, comprising issuable instructions by a processor to:
determine a first allocation of financial resources for a first investment fund, wherein the first allocation of financial resources divides a first set of financial resources between liquid assets and a collection of structured notes;

provide shares of the first investment fund for investment;

determine a second allocation of financial resources for a second investment fund based on a constant proportion portfolio protection methodology, wherein the second allocation of financial resources divides a second set of financial resources between active assets and capital assets; and provide shares of the second investment fund in support of payout obligations for structured notes comprising the collection of structured notes.

26. The non-transitory processor-accessible medium of claim 25, further comprising issuable instructions by a processor to:

determine a first allocation of financial resources for a first investment fund, wherein the first allocation of financial resources divides a first set of financial resources between liquid assets and a collection of structured notes;

provide shares of the first investment fund for investment;

determine a second allocation of financial resources for a second investment fund based on a constant proportion portfolio protection methodology, wherein the second allocation of financial resources divides a second set of financial resources between active assets and capital assets; and provide shares of the second investment fund in support of payout obligations for structured notes comprising the collection of structured notes.

27. The non-transitory processor-accessible medium of claim 25, further comprising issuable instructions by a processor to:

determine additional allocations of financial resources for additional investment funds based on constant proportion portfolio protection methodologies, wherein each additional allocation of financial resources divides an additional set of financial resources between active assets and capital assets; and provide shares of each additional investment fund in support of payout obligations for remaining subsets of structured notes comprising the collection of structured notes.

28. The non-transitory processor-accessible medium of claim 25, further comprising issuable instructions by a processor to:

monitor at least one performance metric for the active assets;

analyze the at least one performance metric to generate a performance metric analysis; and rebalance the second allocation of financial resources for the second investment fund based on a constant proportion portfolio protection methodology and the performance metric analysis.

\* \* \* \* \*